US010547421B2

(12) United States Patent
Palanivelu et al.

(10) Patent No.: US 10,547,421 B2
(45) Date of Patent: Jan. 28, 2020

(54) SCHEDULING FOR POSITIONING REFERENCE SIGNAL (PRS) IN NARROWBAND-INTERNET OF THINGS (NB-IOT)

(71) Applicant: QUALCOMM Incorporated, San Diego, CA (US)

(72) Inventors: Arul Durai Murugan Palanivelu, Bangalore (IN); Kapil Bhattad, Bangalore (IN); Manikandan Chandrasekar, Bangalore (IN); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/718,447

(22) Filed: Sep. 28, 2017

(65) Prior Publication Data

US 2018/0097596 A1  Apr. 5, 2018

Related U.S. Application Data

(60) Provisional application No. 62/451,966, filed on Jan. 30, 2017, provisional application No. 62/423,155, filed on Nov. 16, 2016.

(30) Foreign Application Priority Data

Sep. 30, 2016  (IN) .............................. 201641033621

(51) Int. Cl.
*H04L 5/00* (2006.01)
*H04W 72/04* (2009.01)
(Continued)

(52) U.S. Cl.
CPC .......... *H04L 5/0048* (2013.01); *H04L 5/0005* (2013.01); *H04L 5/0053* (2013.01);
(Continued)

(58) Field of Classification Search
CPC ... H04L 5/0048; H04L 5/0005; H04L 5/0053; H04L 67/12; H04W 4/70; H04W 56/001;
(Continued)

(56) References Cited

U.S. PATENT DOCUMENTS

2015/0188678 A1* 7/2015 Wu ........................ G01S 5/0036
                                                    370/329
2017/0366244 A1* 12/2017 Lee ........................ H04W 24/10
(Continued)

FOREIGN PATENT DOCUMENTS

KR         20160103209 A      9/2016

OTHER PUBLICATIONS

Institute for Information Industry (III): "Discussion on OTDOA for eNB-IoT", 3GPP Draft; R1-167740, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 21, 2016, XP051140795, Retrieved from the Internet: URL:http://www.3gpp.org/ftp/Meetings_3GPP_SYNC/RAN1/Docs/ [retrieved on Aug. 21, 2016], 2 pages.
(Continued)

*Primary Examiner* — Candal Elpenord
(74) *Attorney, Agent, or Firm* — Haynes and Boone, LLP

(57) ABSTRACT

Wireless communications systems and methods related to communicating positioning reference signals (PRSs) for narrowband communication are provided. A first wireless communication device determines a time-frequency PRS pattern based at least in part on a narrowband communication frequency band configuration and a PRS subframe configuration mode associated with a set of subframes. The first wireless communication device communicates, with a second wireless communication device, a plurality of PRSs using the determined PRS time-frequency pattern in the set of subframes. The PRS subframe configuration mode can
(Continued)

indicate a first configuration including a bitmap indicating a set of PRS subframes positioned within a group of contiguous subframes, a second configuration indicating a subset of the group of contiguous subframes that may carry the PRSs, or a combination thereof. The first configuration and/or the second configuration can be used to indicate the set of subframes.

39 Claims, 20 Drawing Sheets

(51) Int. Cl.
*H04W 56/00* (2009.01)
*H04W 4/70* (2018.01)
*H04W 64/00* (2009.01)
*H04L 29/08* (2006.01)

(52) U.S. Cl.
CPC .......... *H04W 4/70* (2018.02); *H04W 56/001* (2013.01); *H04W 64/00* (2013.01); *H04W 72/042* (2013.01); *H04W 72/044* (2013.01); *H04W 72/0466* (2013.01); *H04L 67/12* (2013.01)

(58) Field of Classification Search
CPC . H04W 64/00; H04W 72/042; H04W 72/044; H04W 72/0466
See application file for complete search history.

(56) References Cited

U.S. PATENT DOCUMENTS

| | | | |
|---|---|---|---|
| 2018/0048444 A1* | 2/2018 | Park | H04L 5/005 |
| 2018/0049151 A1* | 2/2018 | Yoon | H04L 5/005 |
| 2019/0029005 A1* | 1/2019 | Bendlin | H04W 72/042 |

OTHER PUBLICATIONS

International Search Report and Written Opinion—PCT/US2017/054426—ISA/EPO—dated Dec. 22, 2017.
ITL: "Support of OTDOA in NB-IoT", 3GPP Draft; R1-167752, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 21, 2016, XP051126074, Retrieved from the Internet: URL:http://www.3gpp.org/ftp/Meetings_3GPP_SYNC/RAN1/Docs/ [retrieved on Aug. 21, 2016], 9 pages.
Qualcomm Incorporated: "Downlink-Based Narrowband Positioning", 3GPP Draft; R1-166303, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 21, 2016, XP051140155, Retrieved from the Internet: URL:http://www.3gpp.org/ftp/Meetings_3GPP_SYNC/RAN1/Docs/ [retrieved on Aug. 21, 2016], 6 pages.
Second Written Opinion—PCT/US2017/054426—ISA/EPO—dated Jul. 4, 2017.
Second Written Opinion—PCT/US2017/054426—ISA/EPO—dated Jul. 4, 2018.

* cited by examiner

SCHEDULING FOR POSITIONING REFERENCE SIGNAL (PRS) IN NARROWBAND-INTERNET OF THINGS (NB-IOT)

CROSS REFERENCE TO RELATED APPLICATIONS

The present application claims priority to and the benefit of the Indian Provisional Patent Application No. 201641033621, filed Sep. 30, 2016 (165624), the U.S. Provisional Patent Application No. 62/423,155, filed Nov. 16, 2016 (170915), and the U.S. Provisional Patent Application No. 62/451,966, filed Jan. 30, 2017 (170915). All of said applications are hereby incorporated by reference in their entirety as if fully set forth below and for all applicable purposes.

TECHNICAL FIELD

The technology discussed in this disclosure relates generally to wireless communication systems, and more particularly to signaling and transmissions of positioning reference signal (PRS) for narrowband-Internet of Things (NB-IoT). Embodiments enable and provide solutions and techniques allowing wireless communication devices (e.g., base stations (BSs) and user equipment devices (UEs)) to communicate PRSs for observed-time-difference-of-arrival (OTDOA) based positioning without causing collisions with other pre-configured network signals, and thus improving positioning performance.

INTRODUCTION

Wireless communication systems are widely deployed to provide various types of communications such as voice, data, video, etc. These systems may be multiple-access systems capable of supporting communication with multiple access terminals by sharing available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. Typically, a wireless communication system comprises several base stations (BSs), wherein each BS communicates with a mobile station or user equipment (UE) using a forward link and each mobile station (or access terminal) communicates with base station(s) using a reverse link.

In recent years, the developments of electronics, information, sensing, and application technologies cause the Internet to evolve from a human-oriented network, where a person creates and consumes information, into Internet of Things (IoT), where distributed elements exchange and process information. Thus, the demand for serving IoT is increasing. IoT devices are typically low cost devices with limited processing resources and are constrained by power consumption. LTE has been enhanced to support narrowband-IoT (NB-IoT) by supporting a reduced bandwidth and reduced transmit power and including power consumption reduction techniques.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for communicating PRSs without causing collisions. For example, collisions that may possibly occur with other pre-configured or fixed-scheduled network signals. A PRS may have a certain time-frequency pattern and may occupy certain time-frequency resources, which may overlap with time-frequency resources pre-configured for a fixed-scheduled network signal. A BS may indicate a subframe configured for carrying a PRS in several formats and may use different PRS time-frequency pattern with different indication formats to avoid the collisions (i.e. efforts for collision handling or pre-collision avoidance efforts).

For example, in an aspect of the disclosure, A method of wireless communication includes determining, by a first wireless communication device, a time-frequency positioning reference signal (PRS) pattern based at least in part on a narrowband communication frequency band configuration and a PRS subframe configuration mode associated with a set of subframes; and communicating, by the first wireless communication device with a second wireless communication device, a plurality of PRSs using the determined PRS time-frequency pattern in the set of subframes.

In an additional aspect of the disclosure, an apparatus includes a processor configured to determine a time-frequency positioning reference signal (PRS) pattern based at least in part on a narrowband communication frequency band configuration and a PRS subframe configuration mode associated with a set of subframes; and a transceiver configured to communicate, with a second wireless communication device, a plurality of PRSs using the determined PRS time-frequency pattern in the set of subframes.

In an additional aspect of the disclosure, a computer-readable medium having program code recorded thereon, the program code includes code for causing a first wireless communication device to determine a time-frequency positioning reference signal (PRS) pattern based at least in part on a narrowband communication frequency band configuration and a PRS subframe configuration mode associated with a set of subframes; and code for causing the first wireless communication device to communicate, with a second wireless communication device, a plurality of PRSs using the determined PRS time-frequency pattern in the set of subframes.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
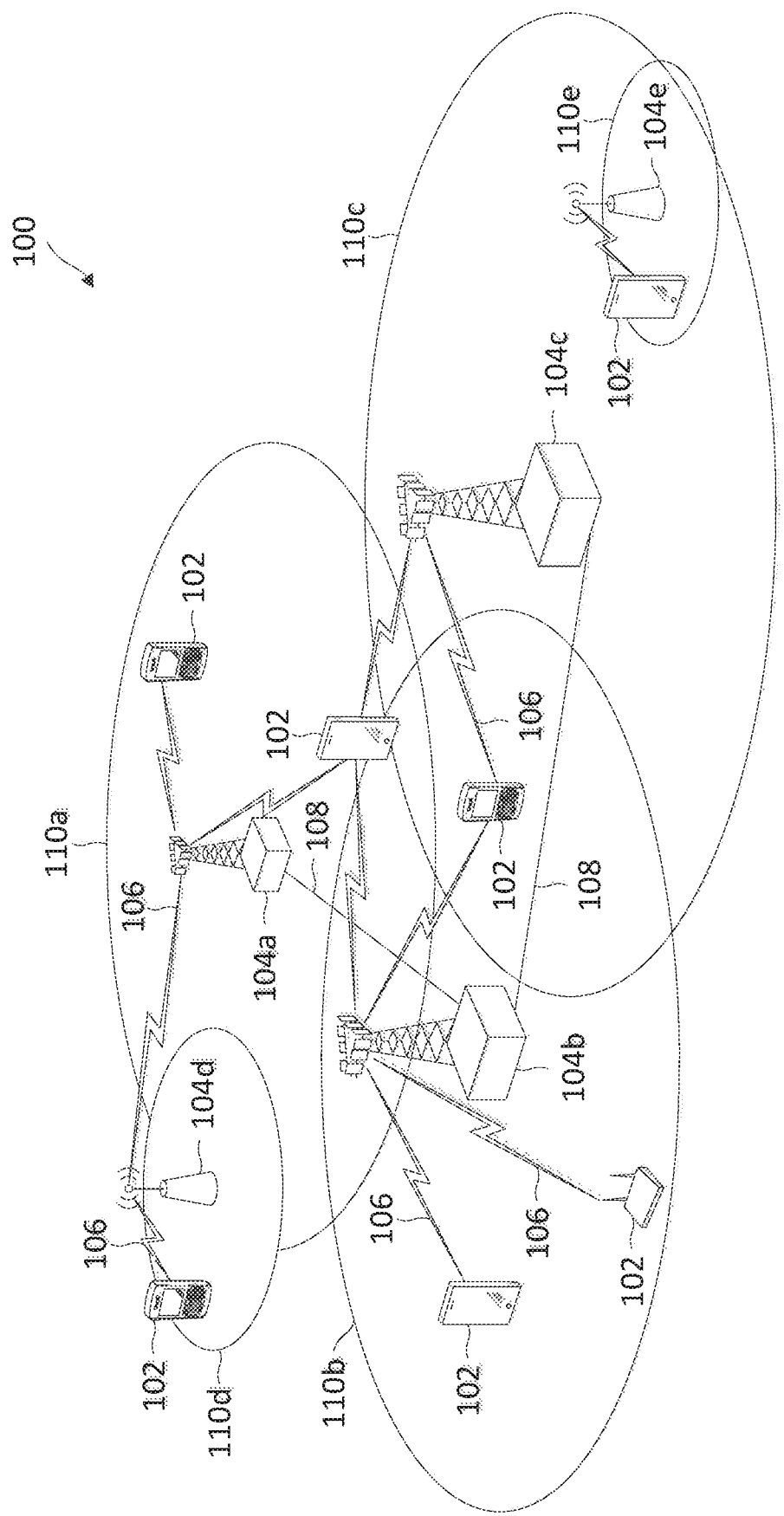
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. It is intended that innovations described herein may be practiced in a wide variety of devices, chip-level components, systems, distributed arrangements, end-user devices, etc.

In LTE, BSs and UEs may exchange several reference signals for estimating channel states, link quality, and the locations of the UEs. For example, BSs may transmit PRSs and a UE may compute various timing measurements based on the PRSs received from multiple neighboring BSs. The BSs may determine the UE location based on the UE's timing measurements. NB-IoT may employ similar mechanisms for UE-location estimation. However, the scheduling of PRSs in NB-IoT may be challenging due to the co-existence of NB-IoT signals and other LTE signals.

The present disclosure describes NPRS scheduling and transmission mechanisms and techniques that may avoid collisions with other LTE signals and improve NPRS performances. In the disclosed embodiments, a BS may configure a plurality of positioning subframes in a plurality of DL subframes for carrying NPRSs, where at least one positioning subframe may overlap with a DL subframe pre-configured for carrying a fixed-scheduled or pre-determined signal (e.g., a reference signal). When an NPRS and a reference signal are mapped to the same time-frequency resource (e.g., a frequency tone within a time symbol), the BS may transmit the reference signal or the NPRS at the time-frequency resource depending on how the BS indicates the positioning subframes within the DL subframes.

In an embodiment, a BS may mark subframes carrying NPRSs as invalid subframe for carrying DL data and determine an NPRS time-frequency pattern irrespective of time-frequency resources pre-configured for a fixed-scheduled channel signal.

In an embodiment, a BS may indicate that a subframe carries an NPRS, but does not mark the subframe as an invalid DL data subframe. In such an embodiment, the BS may determine an NPRS time-frequency pattern by excluding time-frequency resources pre-configured for a fixed-scheduled channel signal and skip over the pre-configured time-frequency resources during NPRS transmissions. In other words, the BS may puncture the time-frequency pattern of the NPRS to exclude the pre-configured time-frequency resource.

In an embodiment, a BS may transmit an NPRS with repetitions (e.g., about 4) in contiguous subframes and may reduce the number of repetitions or skip over subframes that are pre-configured for fixed-scheduled channel signals. The disclosed embodiments are suitable for use in NPRS communications within an in-band communication frequency band, a guard band, a standalone frequency band, and/or a non-anchoring subcarrier of a carrier aggregation. While the disclosed embodiments are described in the context of NPRSs. The disclosed embodiments may be applied to signaling and/or scheduling of other fixed-scheduled channel signals in a wireless network. The NPRSs may also be referred to as PRSs in the disclosed embodiments.

FIG. 1 illustrates a wireless communication network 100 according to embodiments of the present disclosure. The network 100 may include a number of UEs 102, as well as a number of BSs 104. The BSs 104 may include an Evolve Node B (eNodeB). A BS 104 may be a station that communicates with the UEs 102 and may also be referred to as a base transceiver station, a node B, an access point, and the like.

The BSs 104 communicate with the UEs 102 as indicated by communication signals 106. A UE 102 may communicate with the BS 104 via an uplink (UL) and a downlink (DL). The downlink (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108.

The UEs 102 may be dispersed throughout the network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, an IoT device, vehicle, medical device, industrial equipment, wearable, sports equipment, implantable device, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104a, 104b and 104c are examples of macro BSs for the coverage areas 110a, 110b and 110c, respectively. The BSs 104d and 104e are examples of pico and/or femto BSs for the coverage areas 110d and 110e, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15 or 20 MHz, respectively. In an embodiment, the network 100 can support NB-IoT or MTC over LTE, for example, in LTE Release 13, where a portion of a system bandwidth may be reused. For example, the network 100 may operate at a system bandwidth of about 20 MHz and support NB-IoT or MTC, where each UE 102 may be allocated with a reduced bandwidth of about 180 kilohertz (kHz) for NB-IoT and about 1.4 MHz to about 5 MHz for MTC.

In an embodiment, the network 100 can be a LTE network. In such an embodiment, the BSs 104 can assign or schedule transmission resources (e.g., in the form of time-frequency resource blocks) for DL and UL transmissions in the network 100. The communication can be in the form of radio frames. A radio frame may be divided into a plurality of subframes. In a FDD mode, simultaneous UL and DL transmissions may occur in different frequency bands. In a TDD mode, UL and DL transmissions occur at different time periods using the same frequency band. For example, a subset of the subframes in a radio frame may be used for DL transmissions and another subset of the subframes may be used for UL transmissions. The DL and UL subframes can be shared among the BSs 104 and the UEs 102, respectively.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 104 and the UEs 102. For example, a reference signal can have a particular pilot pattern or structure, where pilot tones may span across an operational bandwidth or frequency band, each positioned at a pre-defined time and a pre-defined frequency. Control information may include resource assignments and protocol controls. Data may include protocol data and/or operational data.

To support the operation of the network 100, the BSs 104 may broadcast several signals periodically at a fixed schedule, for example, with pre-determined locations within a subframe. Some examples of fixed-scheduled signals may include a physical broadcast channel (PBCH) signal, a primary synchronization signal (PSS), and a secondary synchronization signal (SSS). The PBCH signal may carry system information, such as cell bandwidths and frame configurations, cell access information, and neighbor cell information. The PSS and SSS include pre-determine signal sequences to allow a UE 102 to synchronize with a BS 104 for communication. To support NB-IoT, the BSs 104 may broadcast similar signals, such as a narrowband PBCH (NPBCH) signal, a narrowband PSS (NPSS), a narrowband SSS (NSSS) corresponding to the PBCH, the PSS, and the SSS, respectively. In addition, the BSs 104 may broadcast a system information block-narrowband (SIB-NB) signal to indicate NB-IoT specific system information.

The network 100 may support UE-location estimation. For example, the BSs 104 may transmit LTE positioning reference signals (PRSs) to the UEs 102. A UE 102 may measure time of arrivals (TOAs) of the LTE PRSs received from multiple BSs 104 and report the timing measurements to a BS 104 serving the UE 102. The serving BS 104 may determine the location of the UE 102 based on the TOAs obtained from the UE 102. In some embodiments, the serving BS 104 may mute a LTE PRS transmission (e.g., transmit with zero power) at a particular time to allow the UE 102 to receive LTE PRSs from neighboring BSs 104 with weaker signal strengths. The network 100 can support UE-location estimation for NB-IoT by employing similar mechanisms. For example, the BSs 104 may transmit the same LTE PRS to the UEs 102. However, the use of LTE PRS may not perform well at a low signal-to-noise ratio (SNR). An alternative approach may be to use N-SSS for UE-location estimation instead of the LTE PRS. However, the use of N-SSS may not benefit from muting.

Figure 2:
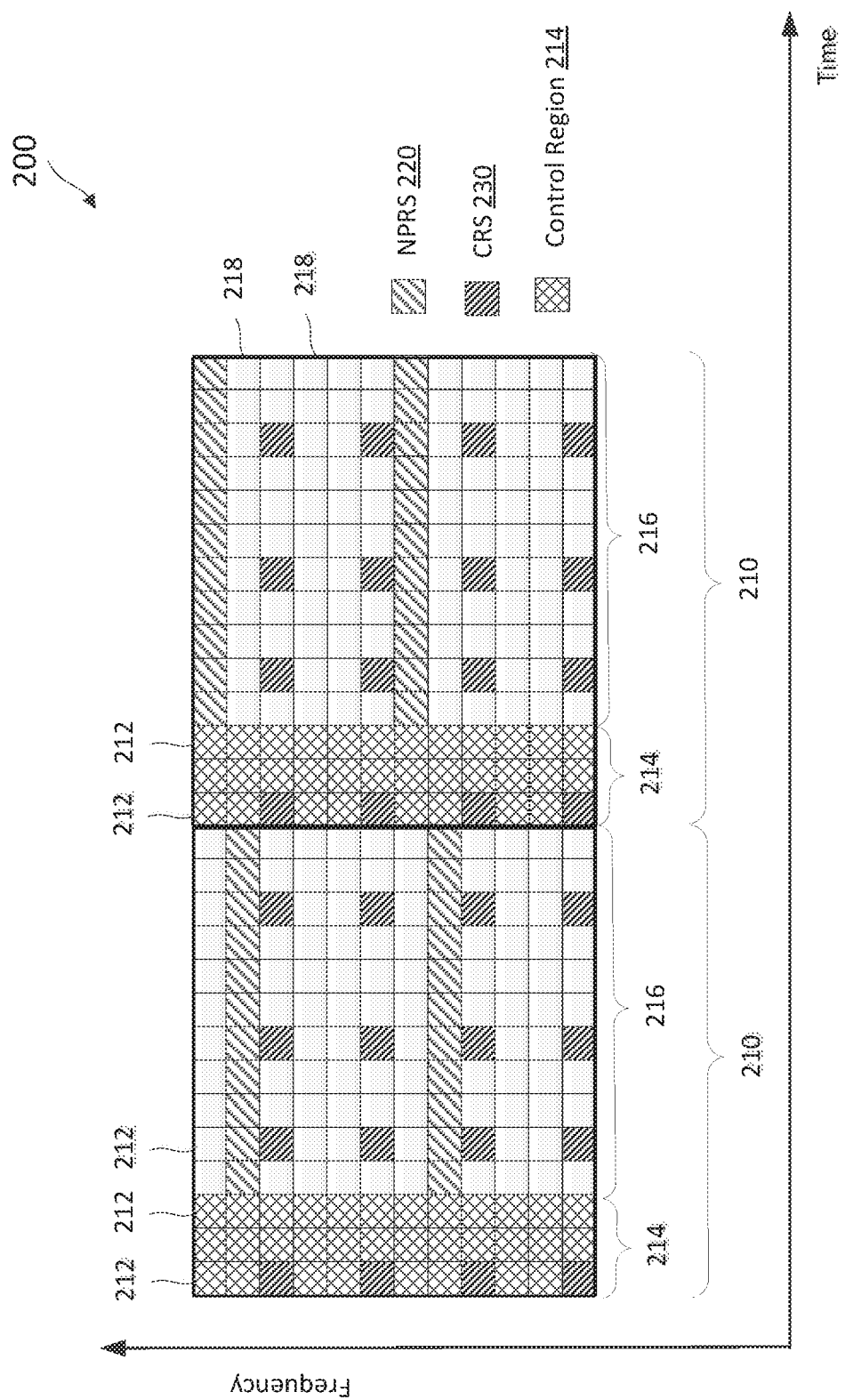
FIG. 2 illustrates a narrowband positioning reference signal (NPRS) configuration according to embodiments of the present disclosure.

FIG. 2 illustrates an NPRS configuration 200 according to embodiments of the present disclosure. The configuration 200 is employed by the BSs 104 to facilitate UE-location estimation. In FIG. 2, the x-axis represents time in some constant units and the y-axis represents frequency in some constant units. The configuration 200 shows two consecutive subframes 210. Each subframe 210 includes a plurality of symbols 212 and each symbol 212 includes a plurality of frequency tones 218. The first 3 symbols 212, which is referred to as a control region 214, are used for transmission of control information, such as allocations and transmission parameters. The remaining symbols 212 in the subframe 210 are referred to as a data region 216. In the LTE context, the control region 214 is referred to as physical downlink control channel (PDCCH) and the data region 216 is referred to as a physical downlink shared channel (PDSCH). A plurality of cell-specific reference signal (CRS) may be transmitted in the subframe 210 in a plurality of frequency tones 218, shown as CRS 230. As shown, the CRS 230 are distributed within the control region 214 and the data region 216.

In the configuration 200, a N-PRS signal may be transmitted based on 2 frequency tones 218, shown as NPRS 220, repeated over the subframe 210 in the data region 216. As shown, the frequency tones 218 of the NPRS 220 are configured to be non-overlapping with the frequency tones of the CRS 230. In addition, the frequency tones 218 of the NPRS 220 are configured in a staggered pattern across the two consecutive subframes 210, where the frequency tones 218 of the NPRS 220 are offset by 1 between adjacent subframes 210. The repetitions in the NPRS 220 allow the NPRS 220 to operate at a low SNR and the staggering allows for a larger dynamic range of TOA estimation.

Figure 3:
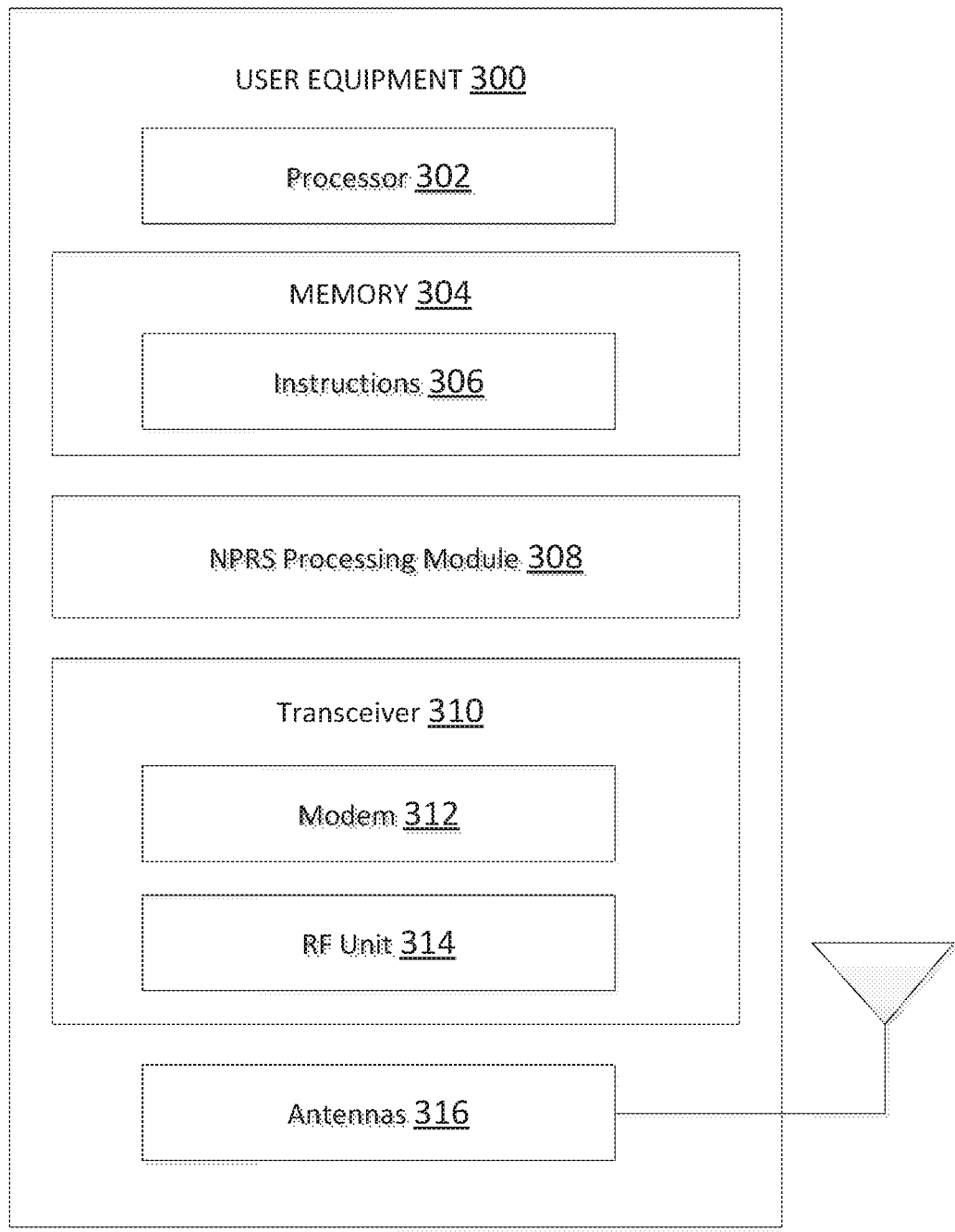
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 102 as discussed above. As shown, the UE 300 may include a processor 302, a memory 304, an NPRS processing module 308, a transceiver 310 including a modem subsystem 312 and a RF unit 314, and an antenna 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 102 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The NPRS processing module 308 may be implemented via hardware, software, or combinations thereof. For example, the NPRS processing module 308 may be implemented as a processor, circuit, and/or instructions 406 stored in the memory 304 and executed by the processor 302. The NPRS processing module 308 may be used for various aspects of the present disclosure. For example, the NPRS processing module 308 is configured to perform timing measurements based on NPRSs such as the NPRS 220 received from BSs such as the BSs 104, as described in greater detail herein.

As shown, the transceiver 310 may include the modem subsystem 312 and the RF unit 314. The transceiver 310 can be configured to communicate bi-directionally with other devices, such as the BSs 104. The modem subsystem 312 may be configured to modulate and/or encode the data from the memory 304 and/or the NPRS processing module 308 according to a modulation and coding method (MCS), e.g., a low-density parity check (LDPC) coding method, a turbo coding method, a convolutional coding method, a digital beamforming method, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 102 or a BS 104. Although shown as integrated together in transceiver 310, the modem subsystem 312 and the RF unit 314 may be separate devices that are coupled together at the UE 102 to enable the UE 102 to communicate with other devices.

The RF unit 314 may provide the modulated and/or processed data, e.g. data packets (or, more generally, data messages that may contain one or more data packets and other information), to the antenna 316 for transmission to one or more other devices. The antenna 316 may further receive data messages transmitted from other devices. This may include, for example, reception NPRSs according to embodiments of the present disclosure. The antenna 316 may provide the received data messages for processing and/or demodulation at the transceiver 310. Although FIG. 3 illustrates antenna 316 as a single antenna, antenna 316 may include multiple antennas of similar or different designs in order to sustain multiple transmission links. The RF unit 314 may configure the antenna 316

Figure 4:
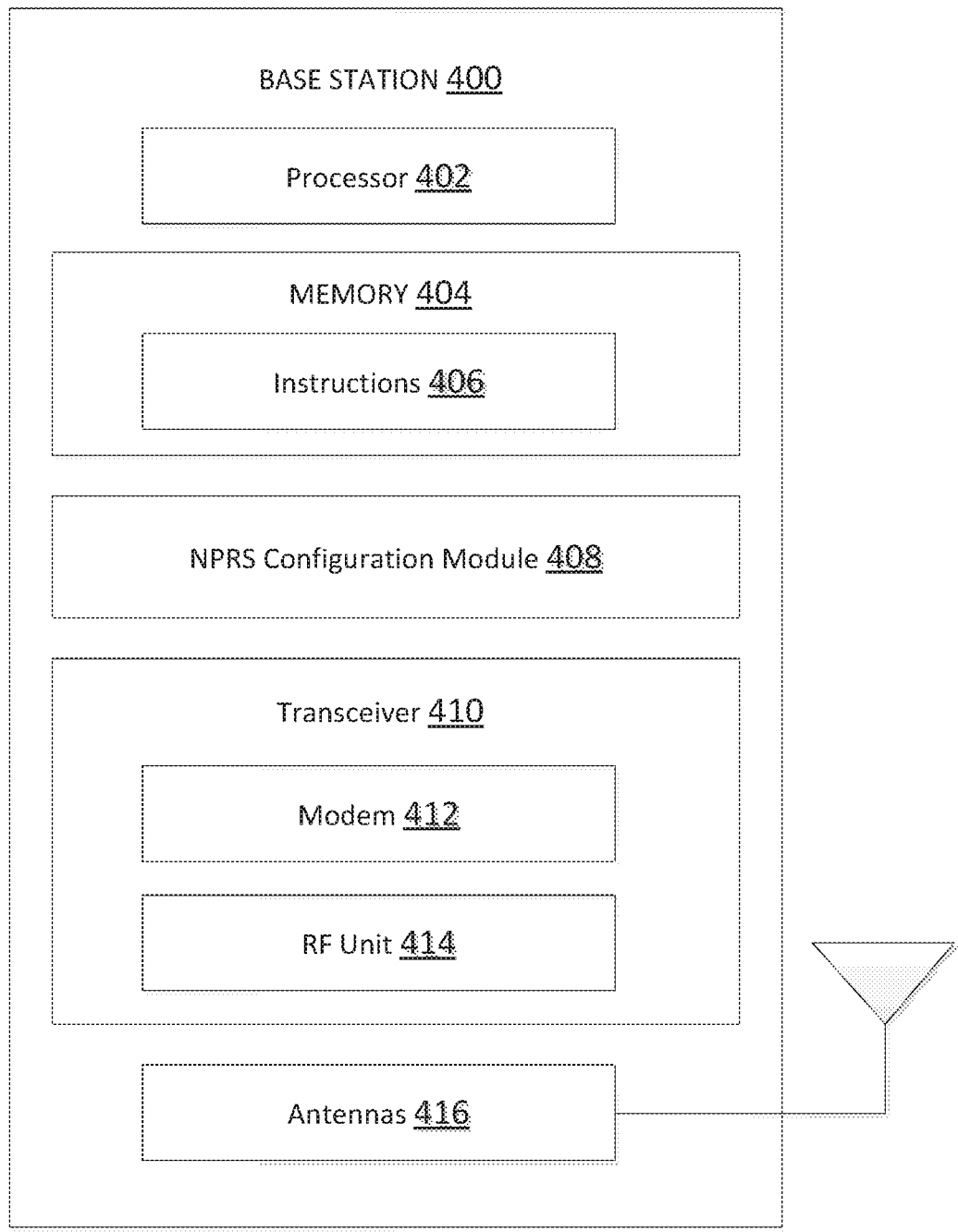
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 104 as discussed above. As shown, the BS 400 may include a processor 402, a memory 404, an NPRS configuration module 408, a transceiver 410 including a modem subsystem 412 and a RF unit 414, and an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 3.

The NPRS configuration module 408 may be implemented via hardware, software, or combinations thereof. For example, the NPRS configuration module 408 may be implemented as a processor, circuit, and/or instructions 406 stored in the memory 404 and executed by the processor 402. The NPRS configuration module 408 may be used for various aspects of the present disclosure. For example, the NPRS configuration module 408 may schedule NPRS transmission, configure NPRS frequency patterns, and signal NPRS configurations, as described in greater detail herein.

As shown, the transceiver 410 may include the modem subsystem 412 and the RF unit 414. The transceiver 410 can be configured to communicate bi-directionally with other devices, such as the UEs 102 and/or another core network element. The modem subsystem 412 may be configured to modulate and/or encode data according to a MCS, e.g., a LDPC coding method, a turbo coding method, a convolutional coding method, a digital beamforming method, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102. Although shown as integrated together in transceiver 410, the modem subsystem 412 and the RF unit 414 may be separate devices that are coupled together at the BS 104 to enable the BS 104 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of information to complete attachment to a network and communication with a camped UE 102 according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
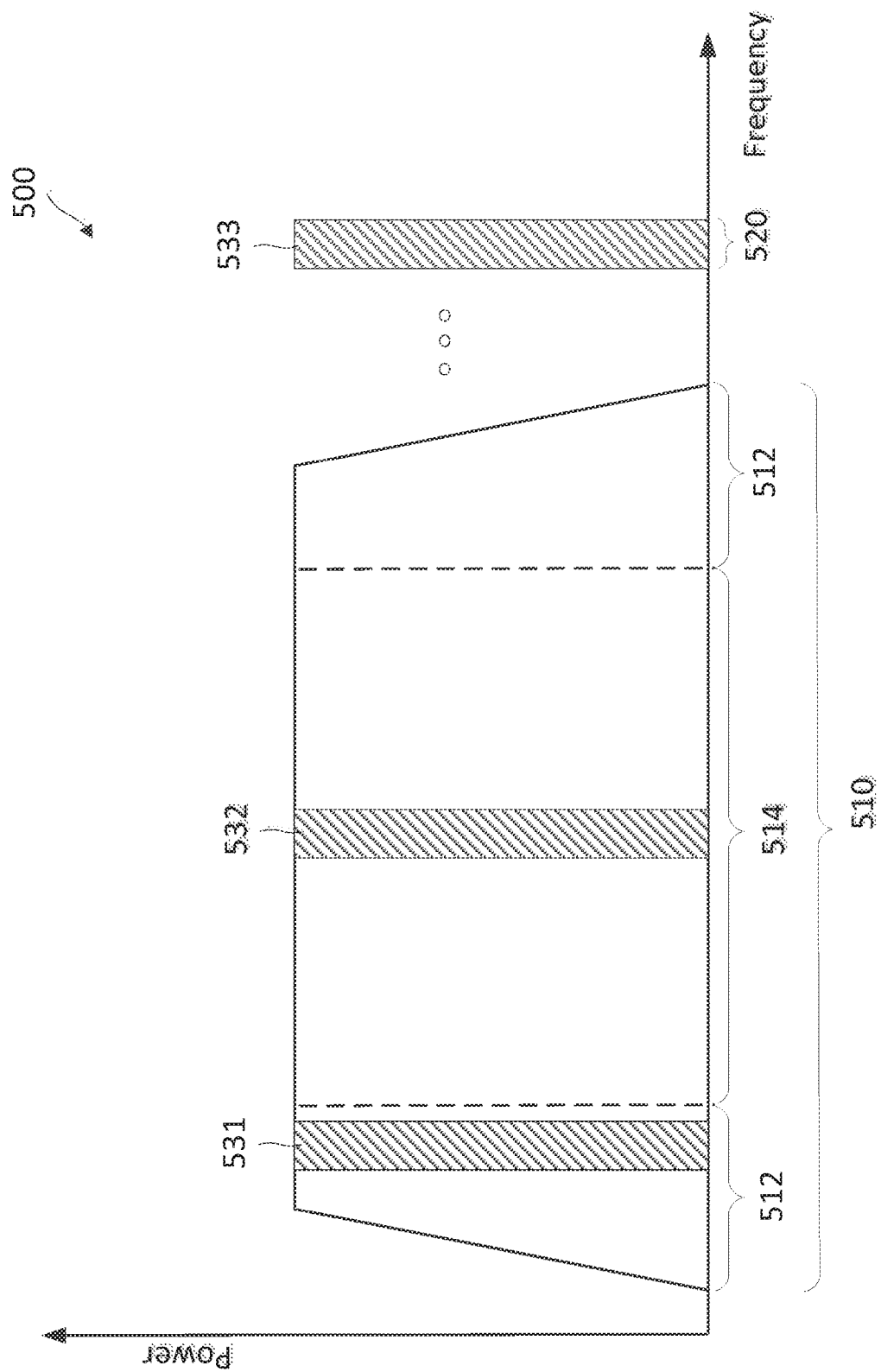
FIG. 5 illustrates an NPRS transmission method according to embodiments of the present disclosure.

FIG. 5 illustrates an NPRS transmission method 500 according to embodiments of the present disclosure. The method 500 is employed by the BSs 104 and 400 to transmit the NPRS 220 in the network 100. In FIG. 5, the x-axis represents frequency in some constant units and the y-axis represents power in some constant units. A BS 104 may transmit NPRSs at various frequencies when operating over a LTE network. In one embodiment, a BS 104 may transmit an NPRS 532 (e.g., the NPRS 220) within a LTE signal band 514 of a LTE system band 510, which may be referred to as an inband mode. In such embodiment, the scheduling of the NPRS 532 (e.g., the NPRS 220) is required to account for scheduling of other LTE signals and NB-IoT signals in order to avoid collisions, as described in greater detail herein. In another embodiment, a BS 104 may transmit an NPRS 531 (e.g., the NPRS 220) within a LTE guard band 512 of the LTE system band 510, which may be referred to as a guard band mode. In another embodiment, a BS 104 may transmit an NPRS 533 in a frequency band 520 outside the LTE system band 510, which may be referred to as a standalone mode. The scheduling of the NPRS 532 or 533 may be less restricted since the NPRS 532 or 533 are transmitted outside of the LTE signal band 514.

Figure 6:
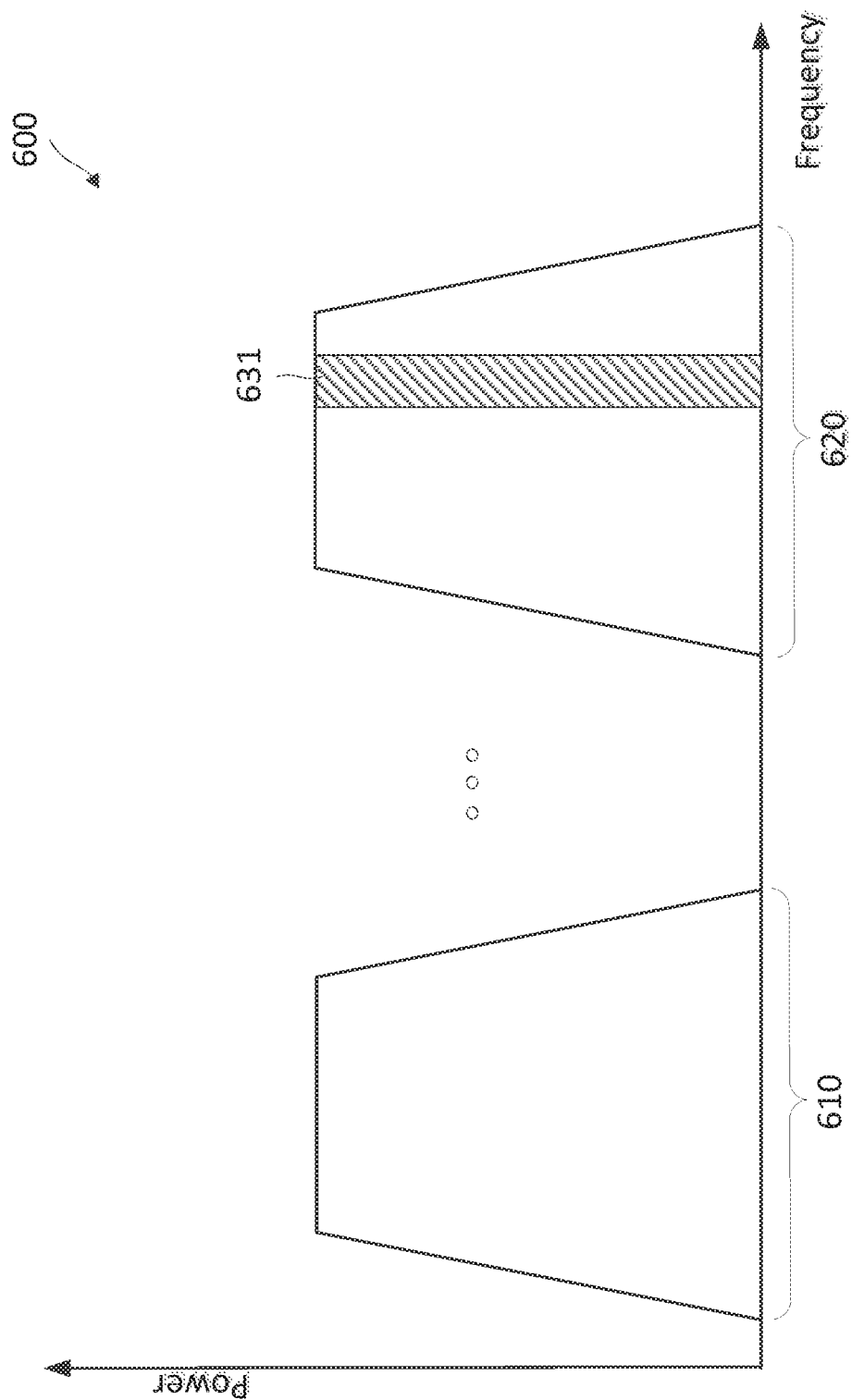
FIG. 6 illustrates an NPRS transmission method according to embodiments of the present disclosure.

FIG. 6 illustrates an NPRS transmission method 600 according to embodiments of the present disclosure. The method 600 is employed by the BSs 104 and 400 to transmit the NPRS 220 in the network 100 when the network 100 employs carrier aggregation. In FIG. 6, the x-axis represents frequency in some constant units and the y-axis represents power in some constant units. FIG. 6 illustrates carrier aggregation with two signal carriers 610 and 620 for purposes of simplicity of discussion, though it will be recognized that embodiments of the present disclosure may scale to many more signal carriers. For example, the signal carrier 610 may be an anchor carrier and the signal carrier 620 may be a non-anchor carrier. The anchor signal carrier 610 may carry fixed-scheduled channel signals such as PBCH, PSS, SSS, NPCH, NPSS, and NSSS. Thus, a BS 104 may transmit an NPRS 631 (e.g., the NPRS 220) in the non-anchor signal carrier 620 to avoid collisions with the fixed-scheduled channel signals.

Figure 7:
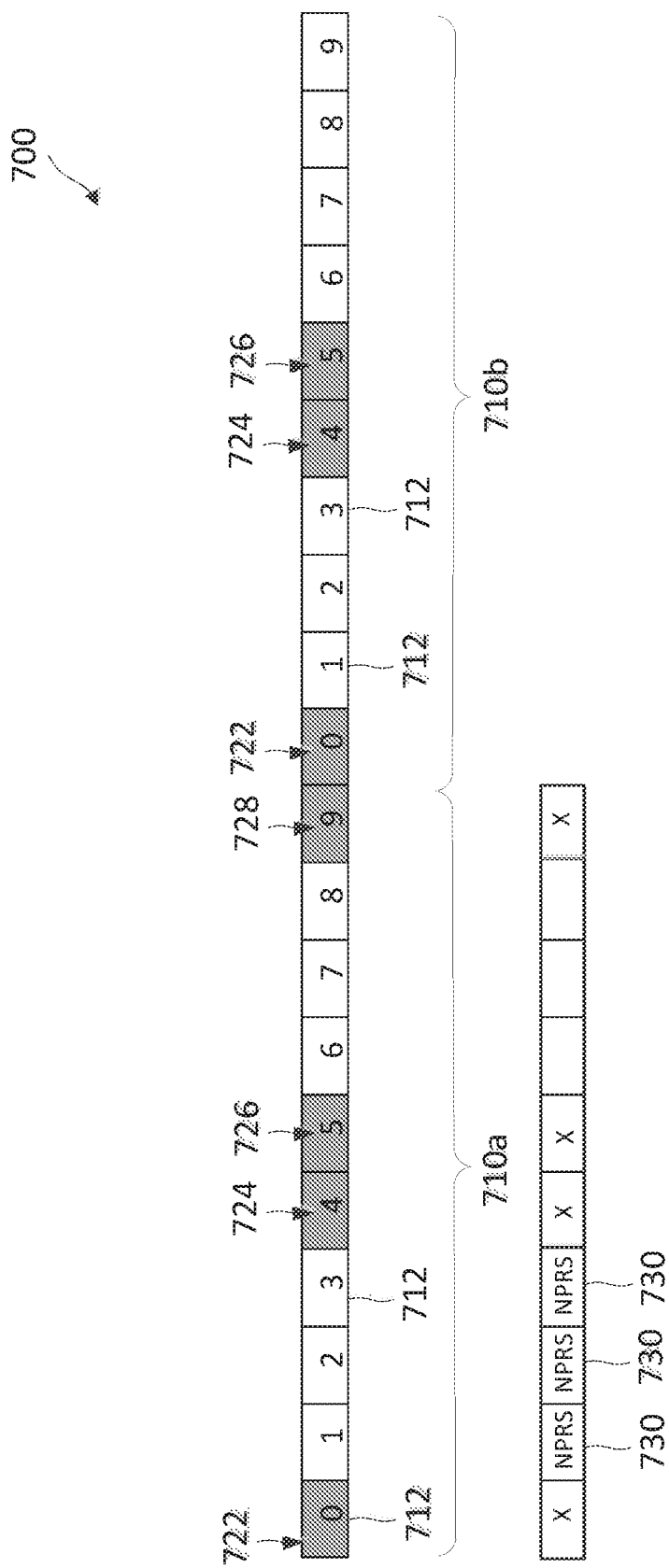
FIG. 7 illustrates an NPRS scheduling method according to embodiments of the present disclosure.
Figure 8:
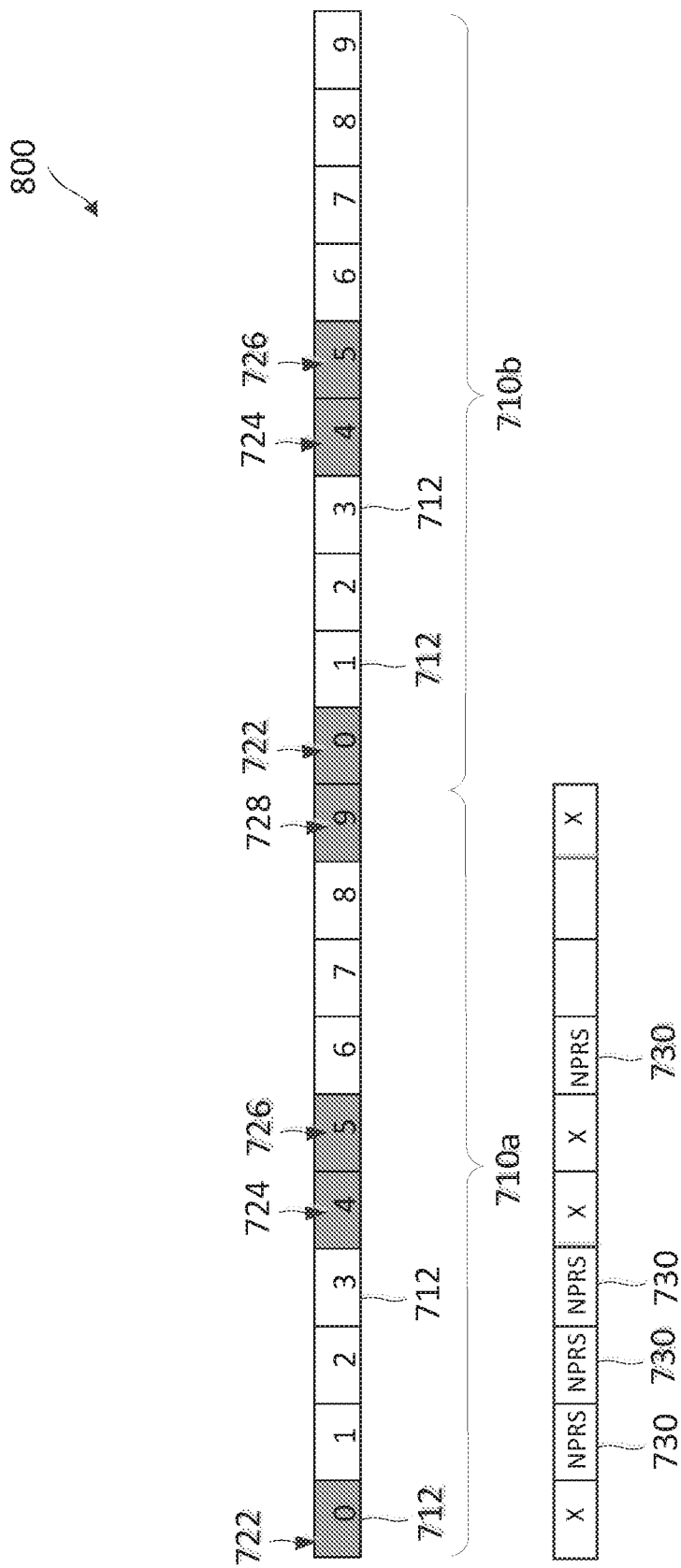
FIG. 8 illustrates an NPRS scheduling method according to embodiments of the present disclosure.

FIGS. 7 and 8 illustrate NPRS scheduling mechanisms for avoiding collisions with fixed-scheduled channel signals when transmitting NPRSs such as the NPRSs 220 and 532 within a LTE signal band such as the LTE signal band 514. FIG. 7 illustrates an NPRS scheduling method 700 according to embodiments of the present disclosure. The method 700 can be employed by the BSs 104 and 400. The method 700 shows two radio frames 710. For example, each radio frame 710 has a duration of about 10 milliseconds (ms). Each radio frame 710 includes ten subframes 712. For example, each subframe 712 has a duration of about 1 ms. The subframes 712 are indexed from 0 to 9.

For example, a BS 104 may schedule transmissions in a DL direction or a UL direction in the subframes 712. The BS 104 may schedule several signals periodically in a fixed schedule. The fixed-scheduled channel signals may include a NPBCH signal 722, a SIB-NB signal 724, a NPSS 726, and a NSSS 728. For example, the NPBCH signal 722 is scheduled for transmission in a subframe 712 indexed 0, denoted as SF0, with a periodicity of one radio frame 710. The SIB-NB signal 724 is scheduled for transmission in a subframe 712 indexed 4, denoted as SF4, with a periodicity of one or more radio frame 710. The NPSS 726 is scheduled for transmission in a subframe 712 indexed 5, denoted as SF5, with a periodicity of one radio frame 710. The NSSS 728 is scheduled for transmission in a subframe 712 indexed 9, denoted as SF9, with a periodicity of two radio frames 710. As shown, the NSSS 728 is scheduled in the radio frame 710a and is skipped in the radio frame 710b. For example, the NSSS 728 may be scheduled in even or odd indexed radio frames 710.

As described above, a BS may transmit an NPRS with repetitions to gain performance for low SNR conditions. As an example, a network may be configured to employ an NPRS with 4 repetitions. The repetitions may be transmitted across contiguous subframes 712 to achieve the best performance for signal combining since channel taps may change when the repetitions are separated by one or more subframes. As shown, the radio frame 710a has two groups of consecutive subframes 712 (e.g., indexed 1 to 3 and indexed 6 to 8) without fixed-scheduled channel signals. In the method 700, the BS may reduce the number of repetitions to avoid collisions (e.g., marked by symbols x) with the fixed-scheduled channel signals. As shown, the BS configures the three available consecutive subframes 712 indexed 1 to 3 as positioning subframes for transmitting three NPRS 730 (e.g., the NPRSs 220 and 532) repetitions and drop the fourth repetition for transmission. The subframes 712 indexed 1 to 3 configured for the NPRS 730 transmissions are referred to as positioning subframes. A UE (e.g., the UEs 102 and 300) may monitor for a configuration from the BS indicating the positioning subframes and receive the NPRSs 730 according to the configuration.

FIG. 8 illustrates an NPRS scheduling method 800 according to embodiments of the present disclosure. The method 800 can be employed by the BSs 104 and 400 to transmit NPRSs with four repetitions. In the method 800, a BS may skip over fixed-scheduled channel signals and complete the four repetitions instead of reducing the number of repetitions as in the method 700. The method 800 is illustrated using the same radio frame configuration as in the method 700. As shown, the BS configures the three available consecutive subframes 712 indexed 1 to 3 and a following available subframe 712 indexed 6 as positioning subframes for transmitting four NPRS 730 repetitions. Similar to the method 700, a UE (e.g., the UEs 102 and 300) may monitor for a configuration from the BS indicating the positioning subframes and receive the NPRSs 730 according to the configuration.

Although the method 700 and 800 are illustrated with transmission of the NPRSs 730 with four repetitions in the radio frame 710a, the NPRSs 730 may be transmitted with any suitable number of repetitions and/or in the radio frame 710b instead. In addition, the NPRS 730 may be transmitted in different groups of consecutive subframes 712 may have different frequency patterns (e.g., different frequency tones 218 or subcarriers). When the BS configures positioning subframes in the radio frame 710b, the BS may include the subframe 712 indexed 9 where the NSSS 728 is not scheduled. However, UEs (e.g., the UEs 102 and 300) in the network are required to be synchronized in radio frame numbers with BSs.

Figure 9:
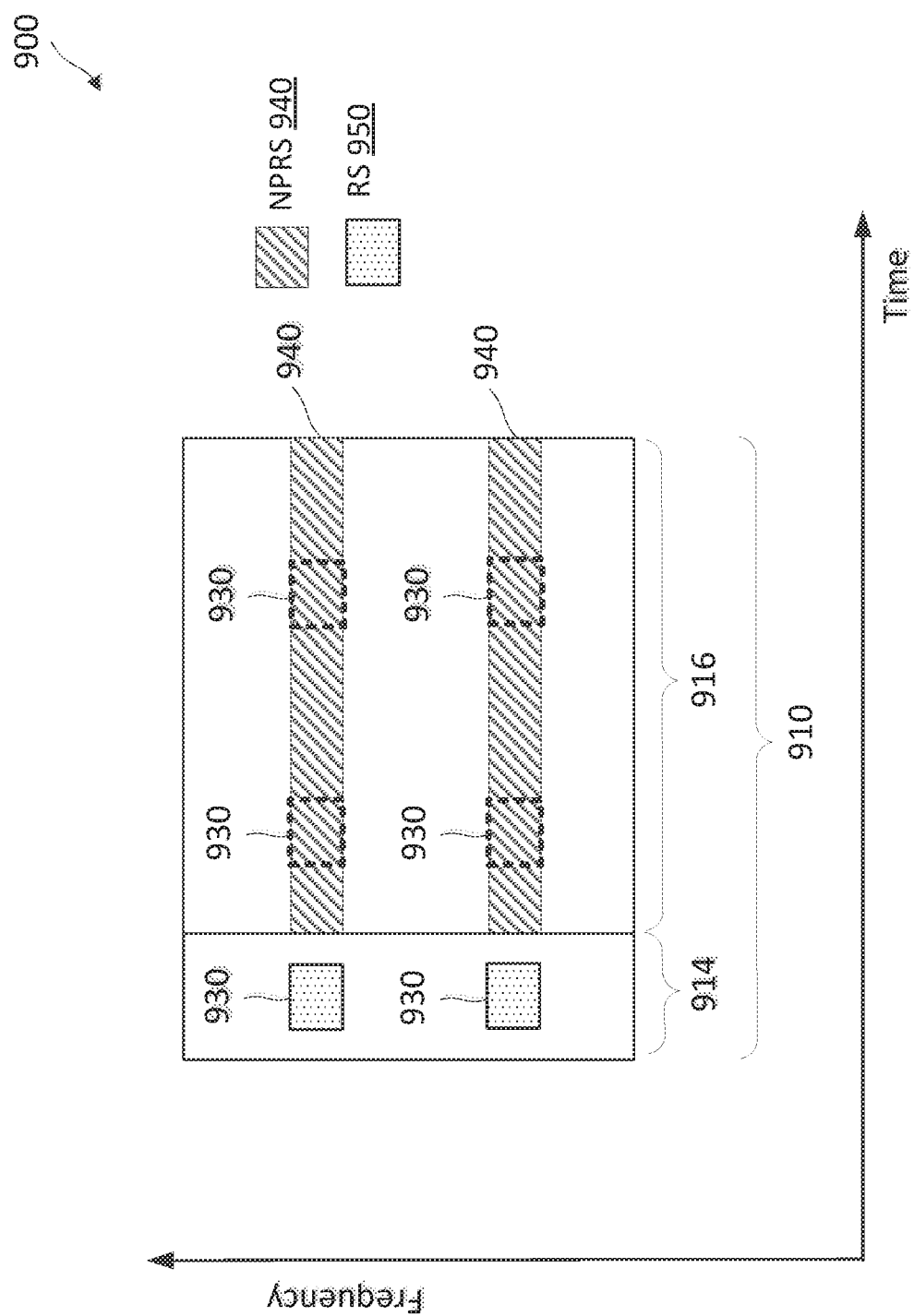
FIG. 9 illustrates an NPRS scheduling method according to embodiments of the present disclosure.
Figure 10:
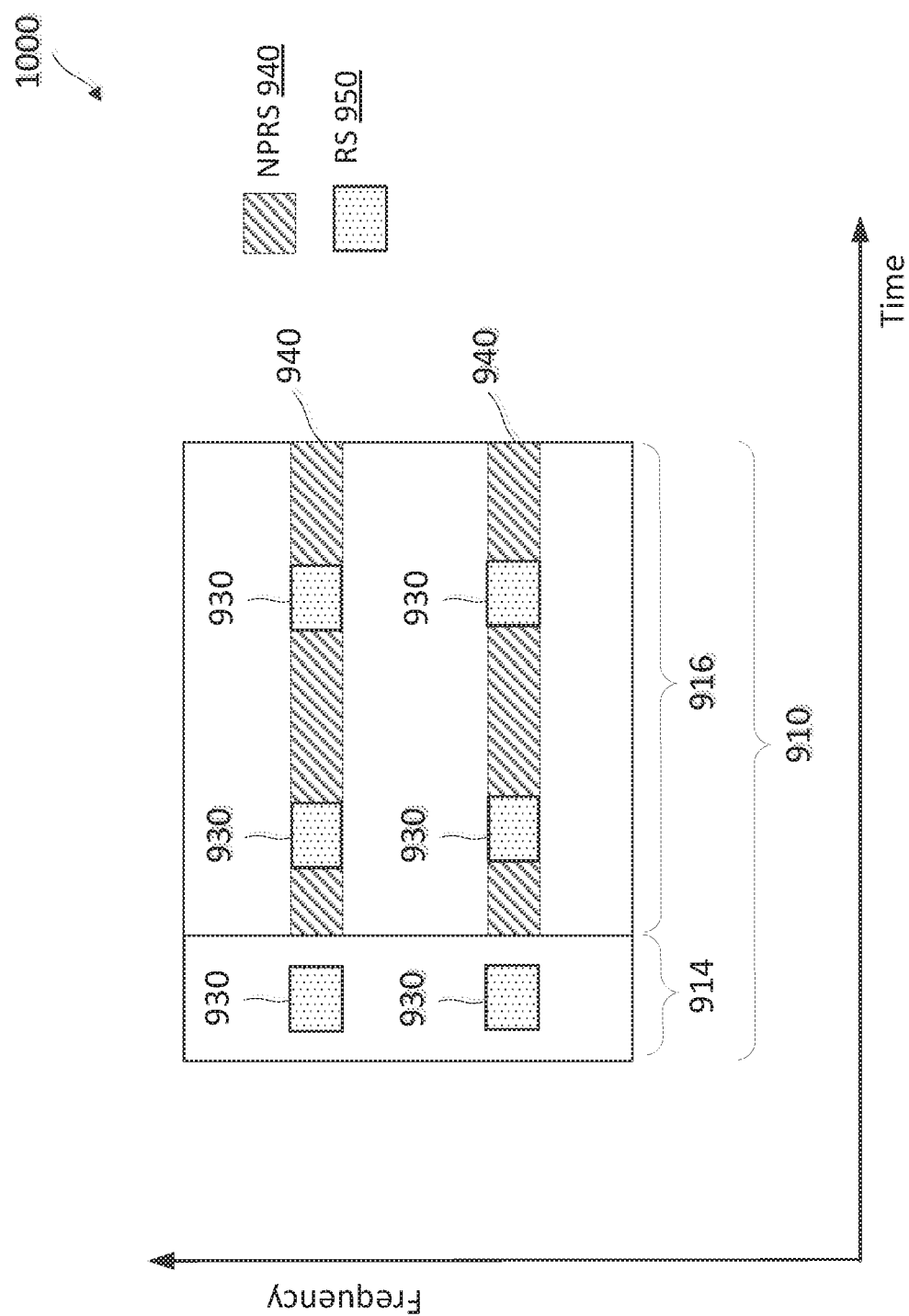
FIG. 10 illustrates an NPRS scheduling method according to embodiments of the present disclosure.

FIGS. 9 and 10 illustrate NPRS scheduling mechanisms for avoiding collisions with reference signals (RSs) when transmitting NPRSs such as the NPRSs 220 and 532 within a LTE signal band such as the LTE signal band 514. Some examples of reference signals may include LTE CRSs (e.g., the CRS 230) and narrowband reference signals (NRSs). NRSs may provide similar functionalities as the LTE CRSs. In FIGS. 9 and 10, the x-axis represents time in some constant units and the y-axis represents frequency in some constant units.

FIG. 9 illustrates an NPRS scheduling method 900 according to embodiments of the present disclosure. The method 900 can be employed by the BSs 104 and 400. For example, a subframe 910 (e.g., the subframes 210 and 712) may be configured to carry a RS 950. The RS 950 may be mapped to a plurality of frequency tones 930 (e.g., the frequency tones 218) in a control region 914 (e.g., the control region 214) and a data region 916 (e.g., the data region 216) of the subframe 910. As an example, a BS may configure the subframe 910 as a positioning subframe for transmitting an NPRS 940 (e.g., the NPRSs 220, 532, and 730). In the method 900, the BS may drop the RS 950 at the symbols where the frequency tones 930 overlap with the NPRS 940 and transmit the NPRS 940 at the overlapped frequency tones 930. The overlapped frequency tones 930 are shown as dashed boxes. In some embodiments, the BS may drop the RS 950 at the symbols that carry the NPRS 940 irrespective of whether there is an overlapped frequency tone 930 between the NPRS 940 and the RS 950. If a receiving UE (e.g., a LTE Release 13 UE) is not aware of the configuration of the NPRS 940, the UE performance may be degraded. Thus, the BS may avoid scheduling NPRSs in subframes that carry DL data for the UE.

FIG. 10 illustrates an NPRS scheduling method 1000 according to embodiments of the present disclosure. The method 1000 can be employed by the BSs 104 and 400. The method 1000 is illustrated with the same subframe configuration as the method 900. However, in the method 1000, the BS may skip over the frequency tones 930 for transmission of the NPRS 940 in the symbols that are configured for the RS 950. As shown, the NPRS 940 and the RS 950 are interleaved in the same frequency band. Thus, the NPRS-density may be lower in the method 1000 when compared to the method 900.

Figure 11:
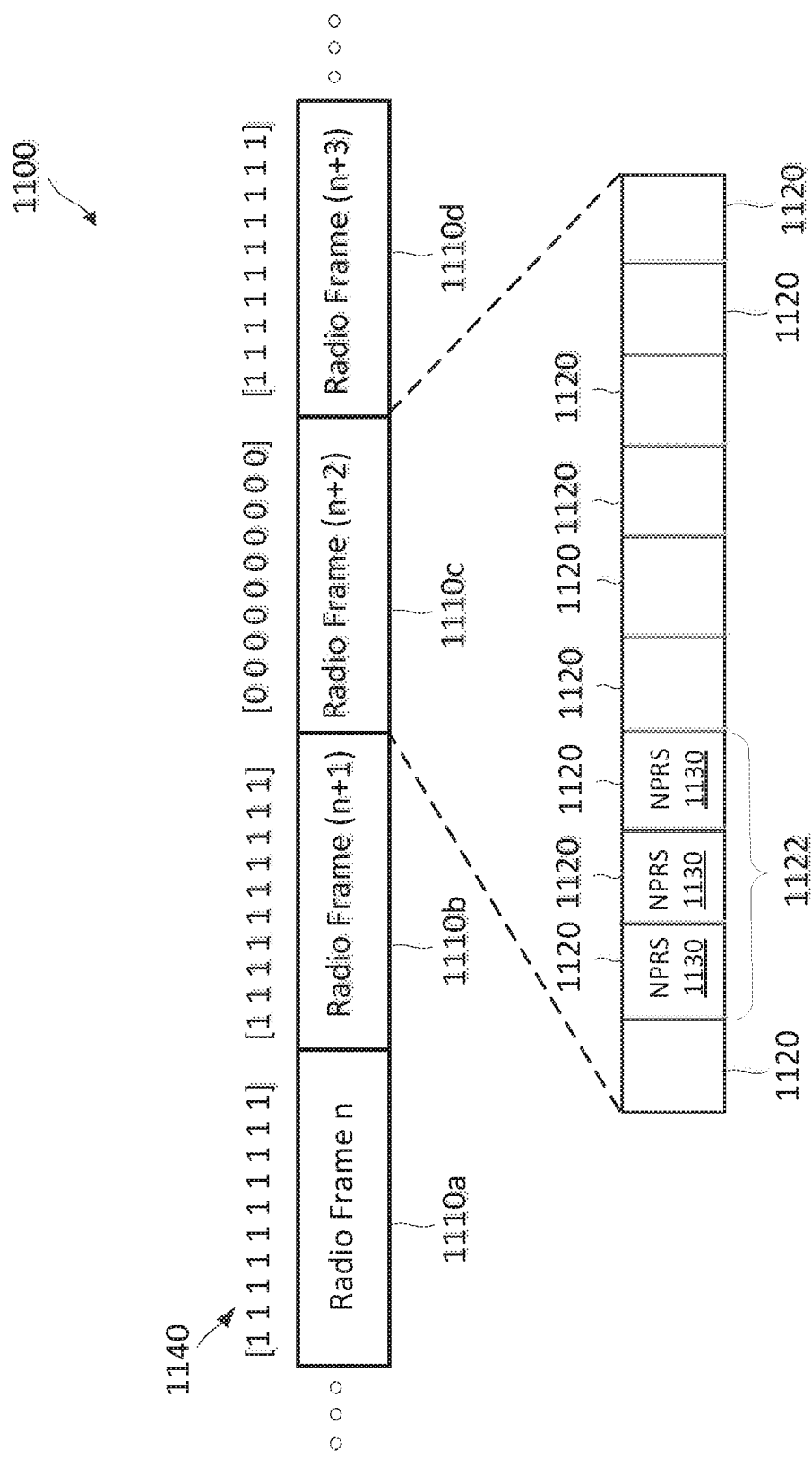
FIG. 11 illustrates a valid downlink (DL) subframe indication method according to embodiments of the present disclosure.
Figure 12:
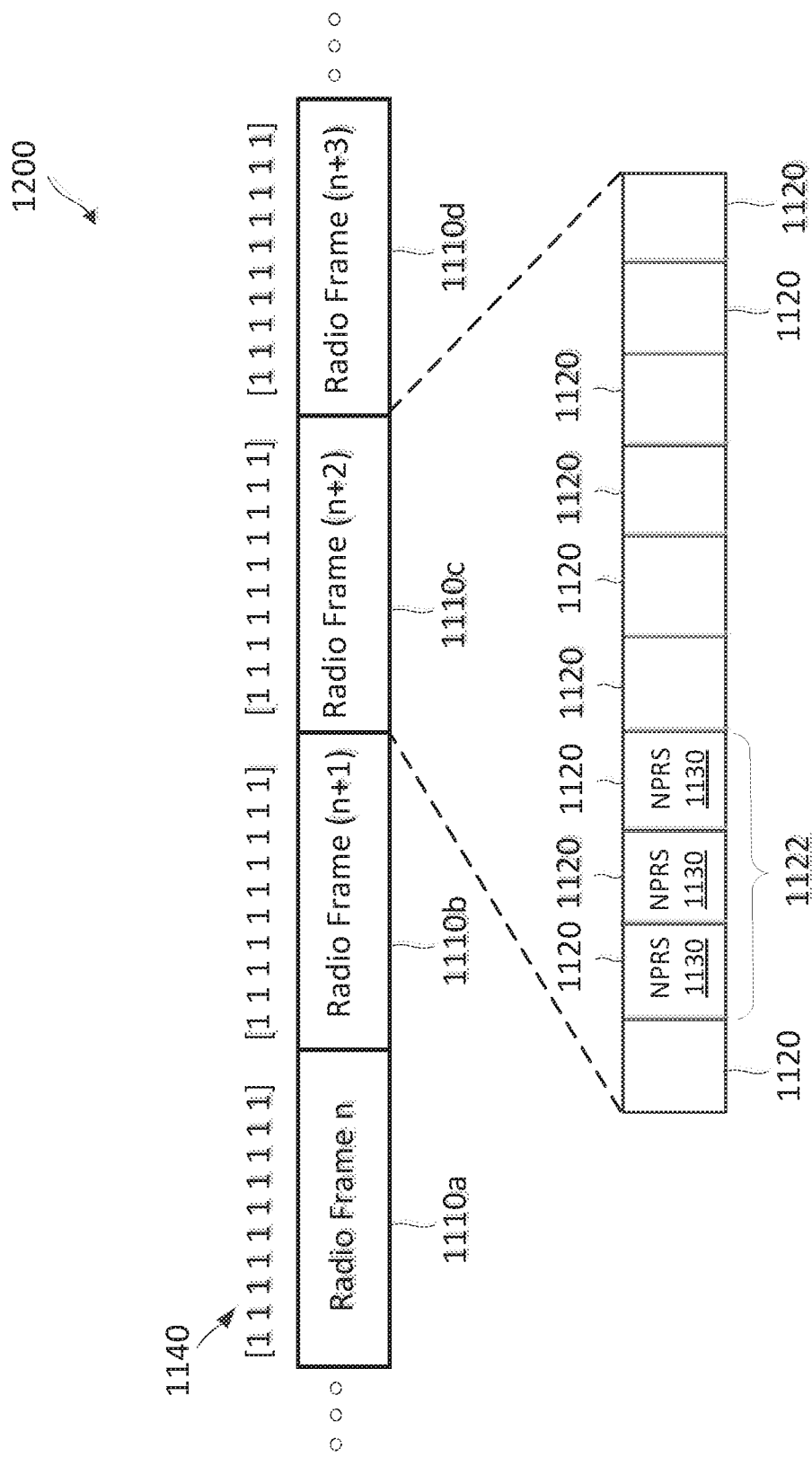
FIG. 12 illustrates a valid DL subframe indication method according to embodiments of the present disclosure.

As described above, the LTE Release 13 includes support for NB-IoT, for example, within a LTE signal band such as the LTE signal band 514. A BS (e.g., the BS 104) may schedule a plurality of DL subframes (e.g., the subframes 210, 712, 910) for transmitting DL data to NB-IoT devices (e.g., the UEs 102). For example, the BS (e.g., the BS 104) may indicate whether a DL subframe carries a DL allocation by using a valid DL subframe mask (e.g., a bit mask). As an example, a bit value of 1 may indicate a DL subframe is scheduled with DL data transmission and a bit value of 0 may indicate a DL subframe is not scheduled for DL data transmission. Thus, a UE may decode the DL subframes that are indicated as valid DL subframes and skip decoding the DL subframes that are indicated as invalid DL subframes. FIGS. 11 and 12 illustrate valid DL subframe indication mechanisms.

FIG. 11 illustrates a valid DL subframe indication method 1100 according to embodiments of the present disclosure. The method 1100 may be employed by the BSs 104 and 400. FIG. 11 illustrates a plurality of radio frames 1110, indexed from n to (n+3), similar to the radio frames 710. As shown, the radio frame 1110c indexed (n+2) is configured with a plurality of positioning subframes 1122 for transmitting NPRSs 1130 (e.g., the NPRSs 220, 532, 730, and 940). In the method 1100, a BS may indicate the subframes 1120 in the radio frame 1110c as invalid DL subframes. As shown, a bitmask 1140 indicates bit values of ones for all subframes in the radio frames 1110a, 1110b, and 1110d that are not configured with positioning subframes and indicates bit values of zeroes for all subframes 1120 in the radio frame 1110c as invalid DL subframes. The method 1100 is suitable for use when the BS operates with UEs (e.g., the UEs 102 and 300) that are not aware of the configuration and scheduling of the NPRSs 1130. For example, the UEs may be LTE Release 13 UEs.

FIG. 12 illustrates a valid DL subframe indication method 1200 according to embodiments of the present disclosure. The method 1200 may be employed by the BSs 104 and 400. The method 1200 is illustrated with the same radio frame configuration as the method 1200. However, in the method 1200, the BS may indicate that all subframes in the radio frames 1110 are valid including the radio frame 1110c configured with the positioning subframes 1122. The method 1200 is suitable for use when the BS operates with UEs (e.g., the UEs 102 and 300) that are aware of the configuration and scheduling of the NPRSs 1130, which may include the locations of the positioning subframes 1122 and repetitions of the NPRSs 1130. For example, the UEs may skip over the positioning subframes 1122 during DL data decoding.

As described above, a BS may employ any of the methods 700-1200 for scheduling NPRS transmissions to avoid collisions with high priority channels or signals when operating in a LTE signal frequency band (e.g., the LTE signal frequency band 514). In one embodiment, a BS may employ the method 700 or 800 to avoid collisions with fixed-scheduled channel signals. In addition, a BS may employ the method 700 or 800 in conjunction with the method 1100 or 1200. For example, the BS may reduce the number of NPRS repetitions or skip the valid DL subframes and continue to complete all the repetitions when subframes are separated by the DL subframes.

In another embodiment, the BS may employ the method 900 or 1000 when a positioning subframe includes NRS signals. However, if a receiving UE is not aware of the NPRS configuration, the UE performance may be degraded. Thus, the BS may avoid scheduling NPRSs in subframes with DL allocations. The BS may employ the method 1000 when a positioning subframe includes LTE CRS, CSI-RS, or PRS. In another embodiment, the BS may reuse the LTE PRS instead of transmitting an NPRS when the LTE PRS and the NPRS have the same frequency pattern.

In some embodiments, the BS may employ different frequency patterns for NPRS in in-band LTE and standalone deployments. For example, when NB-IOT is deployed in-band of an existing LTE deployment, NPRS may be scheduled on a non-anchor carrier avoiding collisions with N-RS and other NB-IOT control channels (e.g., NPBCH, NPSS, NSSS). However, N-PRS on non-anchor carrier would need to be punctured to avoid collision with LTE control signaling (e.g., PDCCH and CRS symbols). When NB-IOT is a standalone deployment, non-anchor carrier may not be available but there is no need to co-exist with LTE signaling (CRS, CSI-RS, PDCCH, and other LTE specific signaling), so N-PRS may be scheduled on the anchor carrier such that it does not overlap with any narrowband broadcast channels, and N-PRS punctured on NRS symbols.

In some embodiments, the BS may employ different frequency patterns for NPRSs. For example, the BS may employ different NPRS frequency patterns in valid DL subframes and in invalid DL subframes. The BS may employ different NPRS frequency patterns across different groups of consecutive subframes. The BS may drop or skip NPRS transmissions in groups of consecutive subframes.

Figure 13:
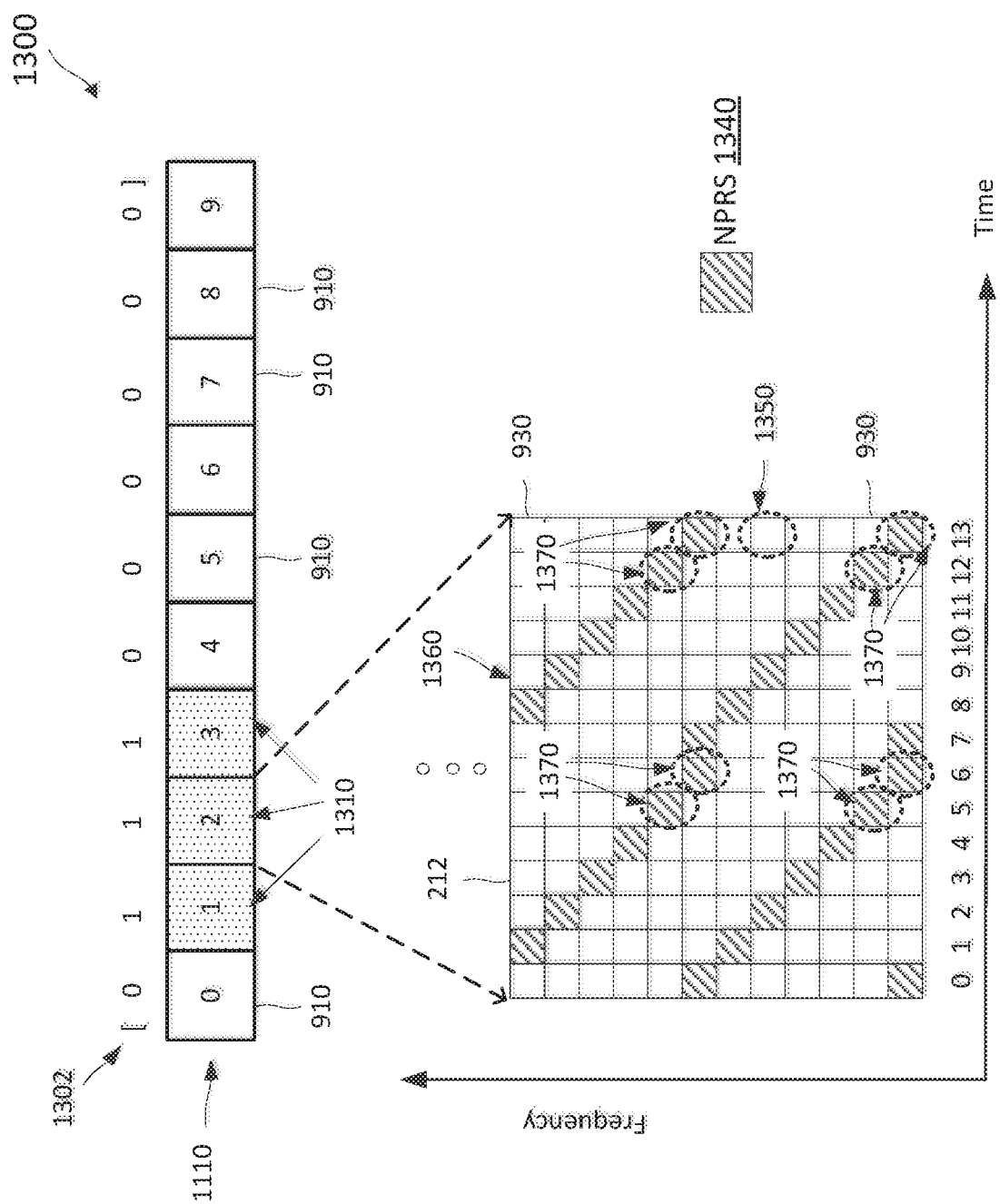
FIG. 13 illustrates an NPRS configuration method according to embodiments of the present disclosure.

FIG. 13 illustrates an NPRS configuration method 1300 according to embodiments of the present disclosure. The method 1300 may be employed by the BSs 104 and 400 and the UEs 102 and 300. In FIG. 13, the x-axis represents time in some constant units and the y-axis represents frequency in some constant units. In the method 1300, a BS may configure a plurality of positioning subframes 1310 in a plurality of subframes 910 within a radio frame 1110. For example, the subframes 910 indexed 1 to 3 are configured as positioning subframes 1310. The BS may mark the positioning subframes 1310 as invalid DL data subframes. The invalid DL data subframes may not carry any DL data. As such, UEs may not process references signals (e.g., pre-configured) for demodulation or decode data from the invalid DL data subframes. For example, the BS may employ a bitmask 1302 to indicate the NPRS subframe configuration. As shown, the bitmask 1302 indicates bit values of zeros for subframes 910 that are not configured with NPRSs and indicates bit values of ones for subframes 910 as invalid DL subframes. The bitmask 1302 may have a fixed bit-length and may be of any suitable bit-length. In some embodiments, the bitmask 1302 may have a bit-length corresponding to a periodicity of a fixed-scheduled channel signal.

A positioning subframe 1310 or a subframe 910 may include a number of time-frequency resource blocks 1360 spanning a number of symbols 212 (e.g., about 14 and indexed from 0 to 13) in time and a number of frequency tones 930 (e.g., about 12) in frequency. The NPRS 1340 is mapped to a number of time-frequency resources 1350 shown as pattern-filled boxes. Each time-frequency resource 1350 corresponds to a frequency tone 930 in a symbol 212.

As an example, at least one of the subframes 910 indexed 1, 2, or 3 may be pre-configured to carry a fixed scheduled channel signals (e.g., NBCH, SIB-NB, NPSS, NSSS, NRS, CRS, CSI-RS, or PRS). Since the BS marks the positioning subframes 1310 as invalid DL data subframes, the BS may determine a time-frequency pattern or time-frequency resources 1350 for the NPRSs 1340 without considering a time-frequency pattern or time-frequency resources (e.g., the time-frequency resources 1370) that are pre-configured for the fixed scheduled channel signal. As shown, the NPRS 1340 occupies the pre-configured time-frequency resources 1370.

In an embodiment, the time-frequency pattern for the NPRSs 1340 may be pre-determined and known to BSs and UEs. For example, a BS may transmit a bitmask 1302 (e.g., a configuration) to indicate the positioning subframes 1310 in the subframes 910 and transmits the NPRSs 1340 in the pre-determined time-frequency pattern. A UE may receive the bitmask 1302 and monitor for an NPRS 1340 in the positioning subframes 1310 indicated by the bitmask 1302. The UE may receive the NPRSs 1340 based on the pre-determined NPRS time-frequency pattern.

In an embodiment, the method 1300 may use a bitmap (e.g., the bitmask 1302) that is of a same length as a DL scheduling valid subframe configuration along with other parameters such as periodicity. The method 1300 may be applied to NPRS transmissions in a guard band (e.g., guard band 512) or a standalone deployment (e.g., in the frequency band 520). The method 1300 may be useful, for example, if it is desirable to schedule NPRSs on invalid DL subframes. In some embodiment, the method 1300 may be referred to as a type A configuration or the NPRS time-frequency pattern may be referred to as a type A NPRS time-frequency pattern.

Figure 14:
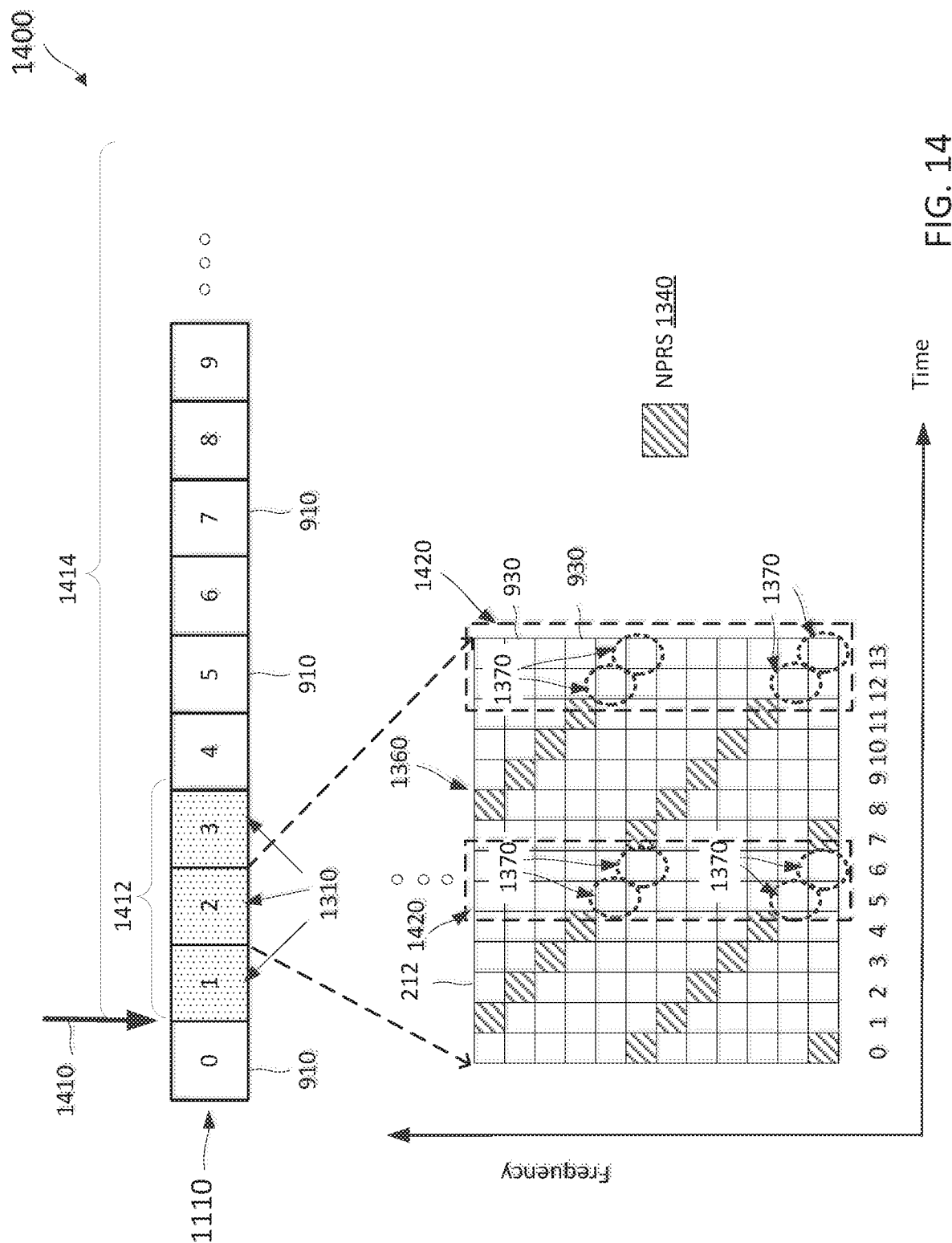
FIG. 14 illustrates an NPRS configuration method according to embodiments of the present disclosure.

FIG. 14 illustrates an NPRS configuration method 1400 according to embodiments of the present disclosure. The method 1400 may be employed by the BSs 104 and 400 and the UEs 102 and 300. In FIG. 14, the x-axis represents time in some constant units and the y-axis represents frequency in some constant units. In the method 1400, a BS may configure a plurality of positioning subframes 1310 in a plurality of subframes 910 within a radio frame 1110 similar to the method 1300. However, the BS may indicate the positioning subframes 1310 by indicating a starting subframe 1410 (e.g., indexed 1), a number 1412 of positioning subframes 1310 starting at the starting subframe 1410, and a periodicity 1414 of the positioning subframes 1310. In addition, the BS may schedule DL data in the positioning subframes 1310 and transmit other fixed-scheduled channel signals in the positioning subframes 1310. To avoid collisions, the BS may determine a time-frequency pattern or time-frequency resources 1350 for the NPRSs 1340 by puncturing or excluding time-frequency resources 1370 (e.g., the time-frequency resources 1350) on symbols 212 (e.g., indexed 5, 6, 12, and 13) that are pre-configured for fixed-scheduled channel signals irrespective of whether there is an overlapped time-frequency resource 1350 between the NPRS 1340 and the fixed-scheduled channel signals as shown by the dashed-boxes 1420. The punctured NPRS time-frequency resources 1370 are shown as empty-filled boxes. In some embodiments, the fixed-scheduled channel signals are pre-configured for symbols 212 indexed 5 and 6 as shown. Comparing the methods 1300 and 1400, the method 1400 punctures the time-frequency resources 1370 that can potentially carry an NPRS 1340 in the type A PRS pattern.

In an embodiment, the punctured time-frequency pattern for the NPRSs 1340 may be pre-determined and known to BSs and UEs. For example, a BS may transmit a bitmask 1302 (e.g., a configuration) to indicate the positioning subframes 1310 in the subframes 910 and transmits the NPRSs 1340 in the pre-determined punctured time-frequency pattern. A UE may receive the bitmask 1302 and monitor for an NPRS 1340 in the positioning subframes 1310 indicated by the bitmask 1302. The UE may receive the NPRSs 1340 based on the pre-determined punctured NPRS time-frequency pattern.

In an embodiment, the method 1400 may use a start subframe (e.g., the starting subframe 1410), a number of subframes (e.g., the number 1412 of positioning subframes 1310), and a periodicity (e.g., the periodicity 1414). The method 1400 may be useful, for example, when it is desirable to configure NPRSs 1340 on a contiguous set of usable PRBs. In some embodiment, the method 1400 may be referred to as a type B configuration or the NPRS time-frequency pattern may be referred to as a type B PRS time-frequency pattern.

In a network (e.g., the network 100), a BS (e.g., the BSs 104 and 400) may indicate positioning subframes (e.g., the positioning subframes 1310) using the methods 1300 and/or 1400. When the BS indicates the positioning subframes using the type A configuration or both the type A and the type B configurations, the BS may transmit NPRSs (e.g., the NPRSs 1340) in a pre-determined NPRS time-frequency pattern without puncturing. A UE receiving the type A configuration may receive NPRSs based on the pre-determined NPRS time-frequency pattern.

Alternatively, when the BS indicates the positioning subframes using only the type B configuration, the BS may transmit NPRSs (e.g., the NPRSs 1340) in a pre-determined punctured NPRS time-frequency pattern. A UE receiving the type B configuration may receive NPRSs based on the pre-determined punctured NPRS time-frequency pattern.

In some embodiments, frequency hopping may be optionally configured for the type B pattern using one or more parameters including a hop duration in number of subframes (e.g., the subframes 910) after which the pattern hops, number of hops, list of frequencies/PRBs where the hopping occurs, and a hopping offset. A UE (e.g., the UEs 102 and 300) may compute a next frequency as (e.g., current PRB+ hop offset) modulo number of available/allowed PRBs.

In some embodiments, when only type B approach (e.g., the method 1400) is used to configure the PRS (e.g., the NPRSs 1340), the UE may assume that other NB-IOT signals (e.g., NPSS, NSSS, NPBCH, NB-IOT SIBs, and the like) are present and, hence, the UE may skip those subframes while considering/processing the configured PRS subframes. When type A (e.g., the method 1300) or Type A with Type B is used to configure the PRS, the UE may assume that all configured PRS subframes (e.g., the positioning subframes 1310) are valid PRS subframes. Such a design may be feasible, for example, when using the bitmap (e.g., the bitmask 1302) on a PRB containing these signals, as the eNB can always set the bitmap in a manner that skips these subframes. At the same time, having this flexibility of UE not skipping those subframes enables the eNB to use other PRBs that may not have such signals (e.g., NPSSS, NSSS, and the like) more efficiently.

In some embodiments, there may also be a dependence on the length of the type A bitmap. For example, if using a 10 bit bitmap, certain NSSS subframes may need to be skipped, as NSSS periodicity is typically 20 ms and the bitmap cannot be set so that subframe to 0 always. When using 40 bit bitmap this is not needed as eNB can configure the bitmap to avoid collisions with NSSS. Alternately, explicit signaling (e.g., via a bit) may be added which indicates whether the UE should skip these subframes or not.

In some embodiments, the decision to skip one or more of the NPSS, NSSS, NPBCH, NB-IOT SIBs subframes may be based on one or more of the following: the type of configuration used for configuring the PRS (e.g., type A only, type B only, or type A and type B simultaneously), the length of the bitmap used for type A configuration, or an explicitly configured bit. For example, when employing type A and B simultaneously, an NPRS may be transmitted in a subframe that is indicated as a positioning subframe by both type A and B configurations.

In some embodiments, when using a type A bitmap to configure PRS on a PRB containing NSSS, NPSSS, NPBCH, SIB, or the like, attention may be given to ensure that subframes containing these signals are set to 0 (i.e. not contain PRS) in the bitmap.

In some embodiments, to benefit from transmit diversity (TxD), a UE may assume that all PRS signals in one PRS beam occasion use the same beam (but across different PRS beam occasions the beams could be different). For type A configuration, a PRS beam occasion may correspond to a fixed multiple of the length of the bitmap. For Type B configuration, a PRS beam occasion may be a fixed multiple of the "num subframe" parameter. In some cases, this fixed multiple may be 1. In an embodiment, a PRS occasion may be defined in units of subframes (e.g., the subframes 910) and may include N number of subframes corresponding to an N-bit bitmap (e.g., the bitmask 1302).

Figure 15:
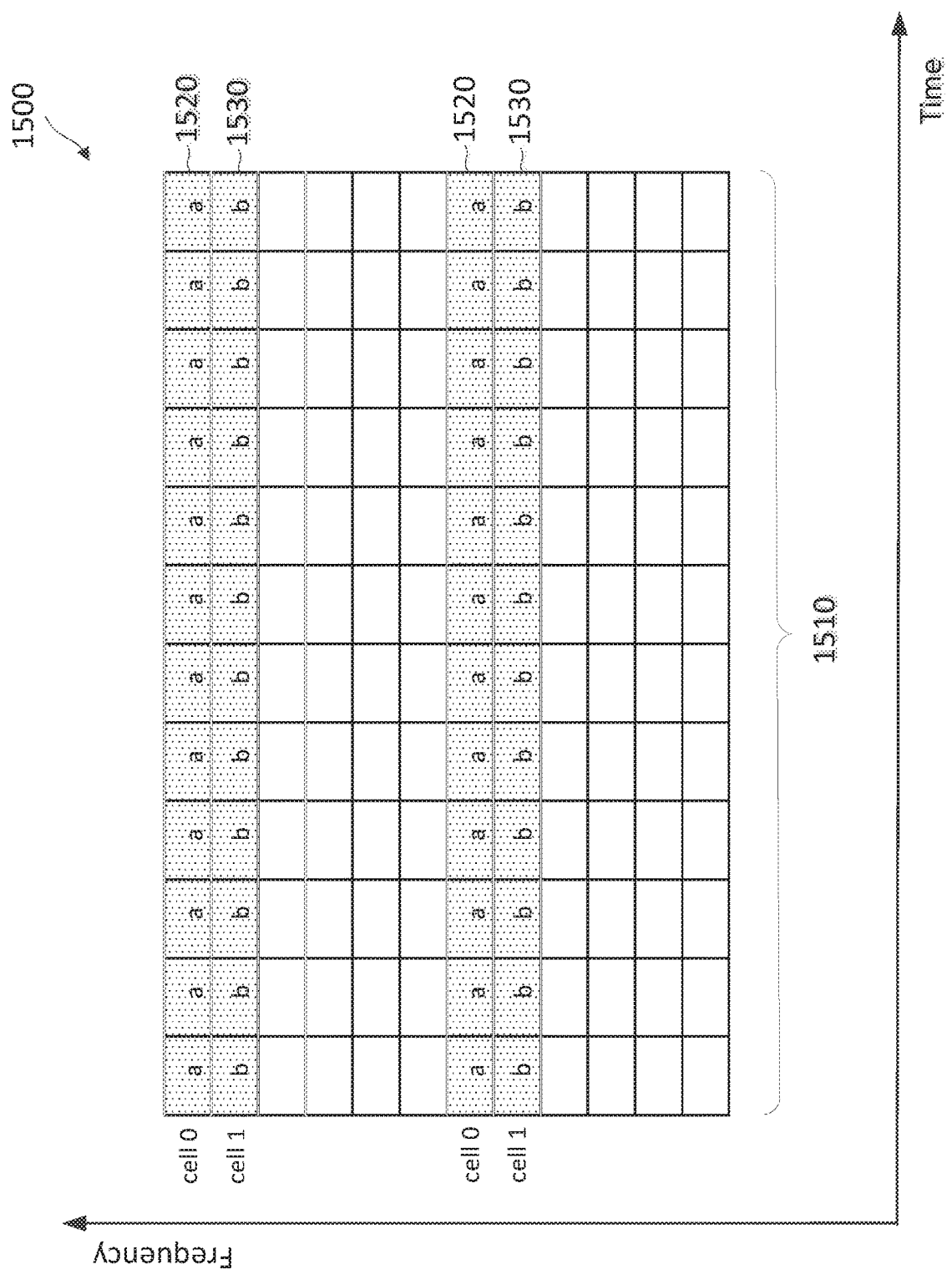
FIG. 15 illustrates a frequency-division multiple access (FDMA) method for NPRS transmissions across multiple cells according to embodiments of the present disclosure.

As described above, a UE 102 may compute timing measurements based on multiple NPRS received from multiple neighboring BSs 104. One approach to increasing reuse factor for NPRS transmissions is to include blank subframes (e.g., with no NPRS transmissions) to enable other BSs to transmit NPRSs in the blank subframes. Another approach is to employ orthogonal codes. FIG. 15 illustrates a FDMA method 1500 for NPRS transmissions across multiple cells according to embodiments of the present disclosure. The method 1500 may be employed by the BSs 104. In FIG. 15, the x-axis represents time in some constant units and the y-axis represents frequency in some constant units. In the method 1500, a BS (e.g., the BS 104*a*) from one cell (e.g., the coverage area 110*b*), denoted as cell 0, may transmit NPRSs (e.g., the NPRSs 220, 532, 730, 940) with an orthogonal code, denoted as a, in frequency tones 1520 (e.g., the frequency tones 218) across a subframe 1510 and another BS (e.g., the BS 104*b*) from another cell (e.g., the coverage area 110*b*), denoted as cell 1, may transmit NPRSs with an orthogonal code, denoted as b, in frequency tones 1530 (e.g., the frequency tones 218) across the subframe 1510 (e.g., the subframes 210, 712, 910, and 1120). The method 1500 may enable NPRS transmission from up to 6 cells over 12 frequency subcarriers or tones.

Figure 16:
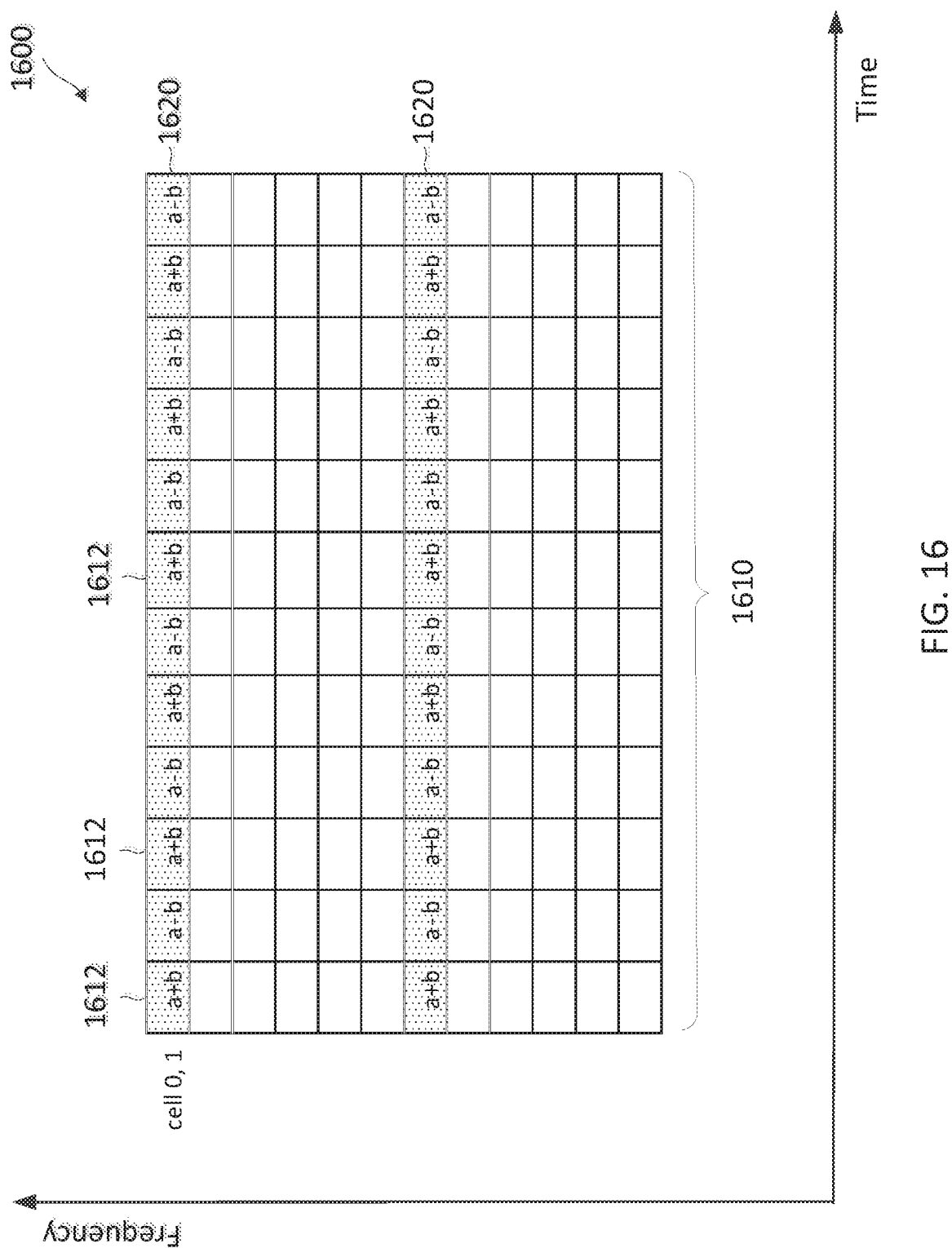
FIG. 16 illustrates a code-division multiple access (CDMA)-based FDMA method for NPRS transmission across multiple cells according to embodiments of the present disclosure.

FIG. 16 illustrates a CDMA-based FDMA method 1600 for NPRS transmission across multiple cells according to embodiments of the present disclosure. The method 1600 may be employed by the BSs 104. In FIG. 16, the x-axis represents time in some constant units and the y-axis represents frequency in some constant units. In the method 1600, two BSs (e.g., the BS 104*a* and 104*b*) may transmit NPRSs on the same frequency tones 1620 (e.g., the frequency tones 218) across a subframe 1610 (e.g., the subframes 210, 712, 910, and 1120). For example, a first BS from one cell, denoted as cell 0, may employ an orthogonal code, denoted as a, for NPRS transmission and a second BS from another cell, denoted as cell 1, may employ an orthogonal code, denoted as b, for NPRS transmission with alternating signs across symbols 1612. Thus, a UE may add or subtract signals from adjacent symbols 1612 to recover NPRSs from the first BS or the second BS, respectively. Thus, the method 1600 may support more than six cells for NPRS transmissions. In some embodiments, the orthogonal code length can be chosen to be less than one subframe depending on the assumptions of Doppler. For example, 2 by 6 cells can be supported with a [+1, −1] code. In some embodiments, the method 1600 may be configured with different number of frequency tones and different orthogonal code lengths to achieve similar functionalities, for example, with 4 frequency tones and an orthogonal code length of 8.

Figure 17:
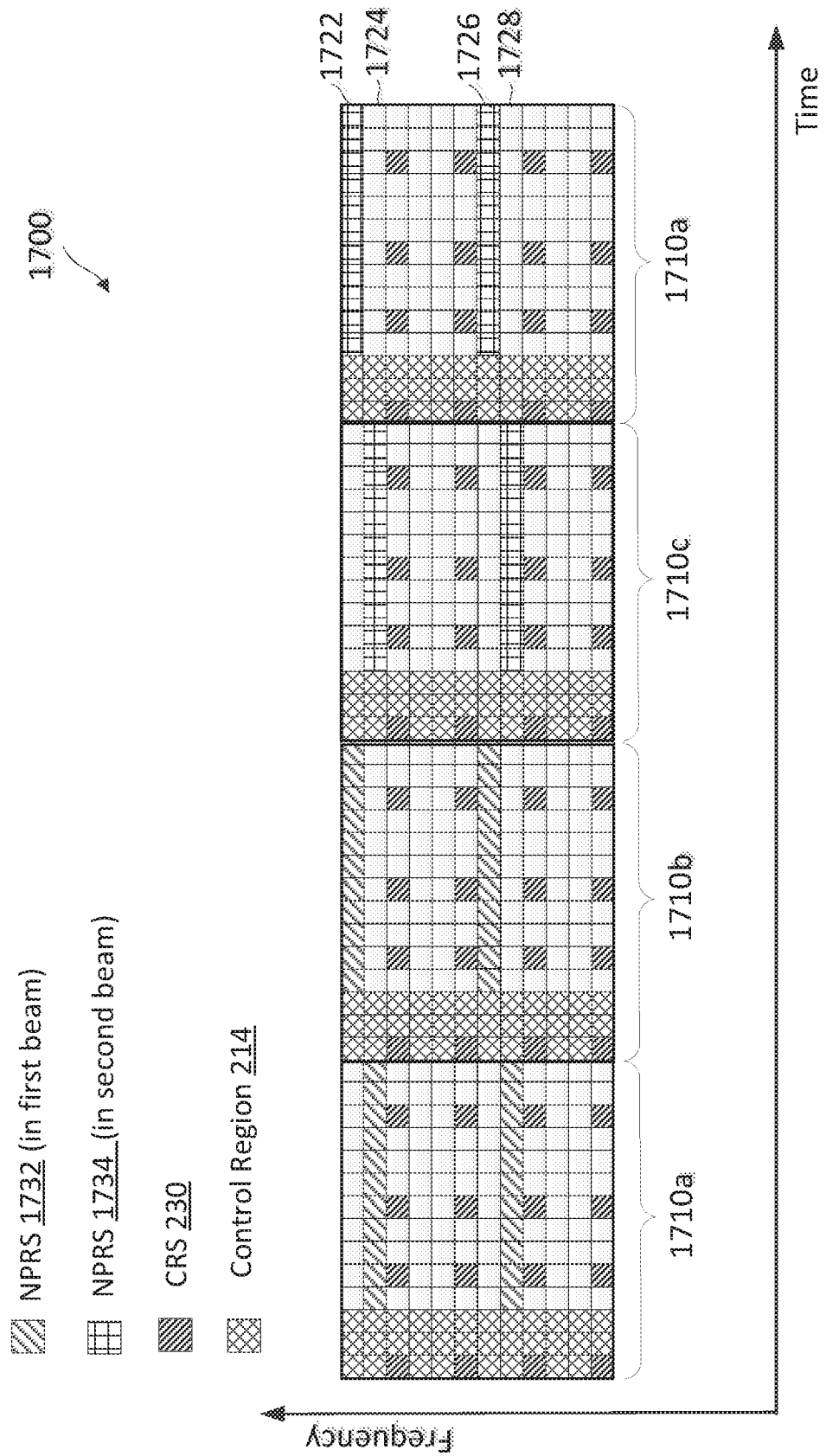
FIG. 17 illustrates an NPRS transmission method including transmit diversity according to embodiments of the present disclosure.

FIG. 17 illustrates an NPRS transmission method 1700 including transmit diversity according to embodiments of the present disclosure. The method 1700 may be employed by the BSs 104. In FIG. 17, the x-axis represents time in some constant units and the y-axis represents frequency in some constant units. In the method 1700, a BS may transmit NPRSs 1732 and 1734 in different beams in different subframes 1710. As shown, the NPRSs 1732 are transmitted in a first beam in consecutive subframes 1710*a* and 1710*b* and the NPRSs 1734 are transmitted in a second beam in consecutive subframes 1710*c* and 1710*d*. For example, the NPRSs 1732 and 1734 have different frequency patterns. As shown, the NPRSs 1732 are transmitted in frequency tones 1724 and 1728 (e.g., the frequency tones 218) in the subframe 1710*a* and in frequency tones 1722 and 1726 in the subframe 1710*b*. The NPRSs 1734 are transmitted in frequency tones 1722 and 1726 in the subframe 1710*c* and in frequency tones 1724 and 1728 in the subframe 1710*d*. When the BS operates with UEs (e.g., UEs 102) that are unaware of the beam configuration for the NPRS transmission, the BS may transmit NPRSs in the same beam in a group of subframes 1710. In some embodiments, the BS may transmit an NPRS configuration including beam directions. In such embodiments, the BS may transmit NPRSs using different beam patterns (e.g., via a pre-determined codebook) across repetitions in a group of subframes 1710. As an example, to schedule NPRS transmissions for 8 subframes with 4 repetitions and two beam directions, the BS may use a codebook with (1,1), (1,j), (1, −j), and (1, −1) for the 4 repetitions instead of with (1,1) and a receiving UE may perform processing based on the codebook.

In some embodiments, one or more of the methods 500 to 1700 described above with respect to FIGS. 5 to 17, respectively, may be used in conjunction with each other in any suitable combinations.

Figure 18:
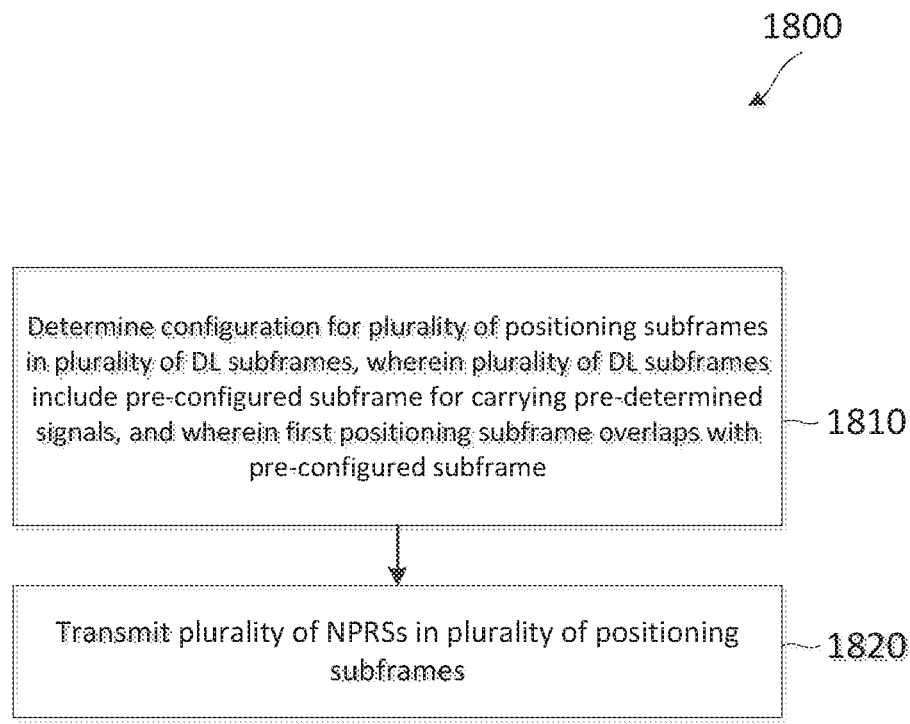
FIG. 18 is a flow diagram of a method of configuring NPRS transmissions according to embodiments of the present disclosure.

FIG. 18 is a flow diagram of a method 1800 of configuring NPRS transmissions according to embodiments of the present disclosure. Steps of the method 1800 can be executed by a computing device (e.g., a processor, processing circuit, and/or other suitable component) of a wireless communication device, such as the BSs 104 and 400. The method 1800 may employ similar mechanisms as in the methods 500 to 1700. The method 1800 can be better understood with reference to FIG. 1. As illustrated, the method 1800 includes a number of enumerated steps, but embodiments of the method 1800 may include additional steps before, after, and in between the enumerated steps. In some embodiments, one or more of the enumerated steps may be omitted or performed in a different order.

At step 1810, the method 1800 includes determining a configuration for a plurality of positioning subframes (e.g., the positioning subframes 1122 and 1310) in a plurality of DL subframes (e.g., the subframes 210, 712, 910, 1120, and 1710). The plurality of DL subframes include a pre-configured subframes for carrying a pre-determined signals, where at a first positioning subframe of the plurality of positioning subframes overlaps (e.g., in time and frequency) with the pre-configured subframe. The pre-determined signals may include a NPBCH signal (e.g., the NPBCH signal 722), a NPSS (e.g., the NPSS 726), a SIB-NB signal (e.g., the SIB-NB signal 724), a NSSS (e.g., the NSSS 728), a LTE CRS (e.g., the CRS 230), a LTE CSI-RS, and/or a NRS.

At step 1820, the method 1800 includes transmitting a plurality of NPRSs (e.g., the NPRSs 220, 531-533, 631, 730, 940, 1130, 1340, 1732, and 1734) in the plurality of positioning subframes, for example, to a UE such as the UEs 102 and 300. The positioning subframes and the transmission of the NPRSs may be configured by employing similar mechanisms as described in the methods 500-1700.

In an embodiment, the wireless communication device may configure the configuration (e.g., the bitmasks 1140 and 1302) to indicate that the plurality of positioning subframes is invalid for carrying DL data. The wireless communication device may determine first resources in the plurality of positioning subframes for the plurality of PRSs irrespective of a second resource (e.g., the pre-configured resources 1370) in the pre-configured subframe pre-configured for the pre-determined signal, for example, using the method 1300. For example, the first resources may include the second resource. The wireless communication device may transmit the plurality of PRSs using the first resources and refrain from transmitting the pre-determined signal in the second resource.

In an embodiment, the wireless communication device may configure the configuration to indicate at least one of a starting subframe (e.g., the starting subframe 1410) of the DL subframes, a number of the plurality of positioning subframes (e.g., the number 1412 of positioning subframes 1310) beginning at the starting subframe, or a periodicity (e.g., the periodicity 1414) of the plurality of positioning subframes. The wireless communication device may determine first resources in the plurality of positioning subframes for the plurality of PRSs by excluding a second resource (e.g., the pre-configured resources 1370) in the pre-configured subframe pre-configured for the pre-determined signal and transmit the plurality of PRSs using the first resources.

In an embodiment, the wireless communication device may transmit the configuration, for example, to UEs such as the UEs 102 and 300. In an embodiment, the wireless communication device may transmit a first configuration indicating that the plurality of positioning subframes are invalid for carrying DL data. The wireless communication device may additionally transmit a second configuration indicating at least one of a starting subframe of the DL subframes, a number of second positioning subframes beginning at the starting subframe, or a periodicity of the second positioning subframes. The one of the plurality of positioning subframes and one of the second positioning subframes correspond to a first DL subframe of the plurality of DL subframes. The wireless communication device may transmit the plurality of PRSs by transmitting a first PRS of the plurality of PRSs in the first DL subframe.

In an embodiment, the wireless communication device may transmit the PRSs using various frequency bands, such as the an in-band communication frequency band (e.g., the frequency band 514) associated with the plurality of DL subframes, a frequency band (e.g., the frequency bands 512 and 520) outside of the in-band communication frequency band, or a non-anchoring signal carrier (e.g., the signal carrier 620) of a carrier aggregation associated with the plurality of DL subframes.

In an embodiment, the wireless communication device may transmit a first PRS of the plurality of PRSs using a first beam and a second PRS of the plurality of PRSs using a different second beam. In some embodiments, the wireless communication device may transmit PRSs in one beam direction during a set of consecutive subframes (e.g., the positioning subframes 1310) and switches to another beam direction to transmit PRSs in another set of consecutive subframes.

Figure 19:
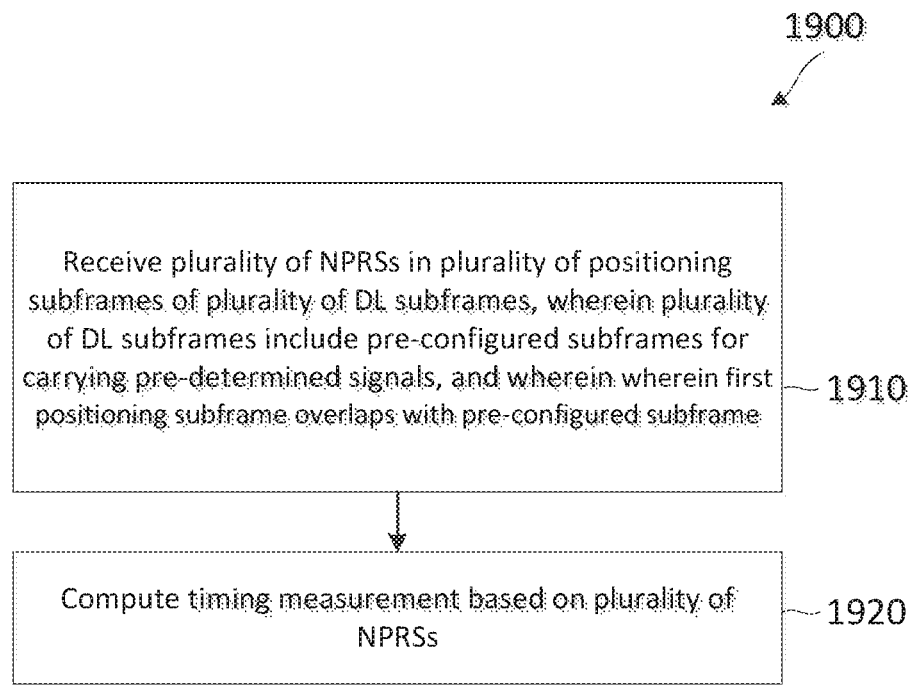
FIG. 19 is a flow diagram of a method of processing NPRSs according to embodiments of the present disclosure.

FIG. 19 is a flow diagram of a method 1900 of processing NPRSs according to embodiments of the present disclosure. Steps of the method 1900 can be executed by a computing device (e.g., a processor, processing circuit, and/or other suitable component) of a wireless communication device, such as the UEs 102 and 300. The method 1900 may employ similar mechanisms as in the methods 500 to 1700. The method 1900 can be better understood with reference to FIG. 1. As illustrated, the method 1900 includes a number of enumerated steps, but embodiments of the method 1900 may include additional steps before, after, and in between the enumerated steps. In some embodiments, one or more of the enumerated steps may be omitted or performed in a different order.

At step 1910, the method 1900 includes receiving a plurality of NPRSs (e.g., the NPRSs 220, 531-533, 631, 730, 940, 1130, 1340, 1732, and 1734) in a plurality of positioning subframes (e.g., the positioning subframes 1122 and 1310) of a plurality of DL subframes (e.g., the subframes 210, 712, 910, 1120, and 1510), for example, from a BS such as the BSs 104 and 400. The plurality of DL subframes include a pre-configured subframe for carrying a pre-determined signals, wherein a first positioning subframe of the plurality of positioning subframes overlaps (e.g., in time and frequency) with the pre-configured subframes. The pre-determined signals may include a NPBCH signal (e.g., the NPBCH signal 722), a NPSS (e.g., the NPSS 726), a SIB-NB signal (e.g., the SIB-NB signal 724), a NSSS (e.g., the NSSS 728), a LTE CRS (e.g., the CRS 230), a LTE CSI-RS, and/or a NRS.

At step 1920, the method 1900 includes computing a timing measurement (e.g., TOA) based on the plurality of NPRSs.

In an embodiment, the wireless communication device receives a configuration indicating the plurality of positioning subframes in the plurality of DL subframes, wherein the receiving is based on the configuration.

In an embodiment, the configuration may indicate that the plurality of positioning subframes is invalid for carrying DL data. The configuration may include a bitmap (e.g., the bitmasks 1140 and 1302) including a plurality of bits associated with the plurality of DL subframes, each of the plurality of bits indicating whether a corresponding DL subframe is invalid for carrying the DL data. The wireless communication device may receive the plurality of PRSs from first resources during the plurality of positioning subframes, the first resources including a second resource (e.g., the pre-configured time-frequency resources 1370) in the pre-configured subframe pre-configured for the pre-determined signal.

In an embodiment, the configuration may indicate at least one of a starting subframe (e.g., the starting subframe 1410) of the DL subframes, a number of the plurality of positioning subframes (e.g., the number 1412 of positioning subframes) beginning at the starting subframe, or a periodicity (e.g., the periodicity 1414) of the plurality of positioning subframes. The wireless communication device may receive the plurality of PRSs from first resources during the plurality of positioning subframes, the first resources excluding a second resource in the pre-configured subframe pre-configured for the pre-determined signal.

In an embodiment, the wireless communication device may receive a first configuration from a BS indicating that the plurality of positioning subframes are invalid for carrying DL data. The wireless communication device may additionally receive a second configuration indicating at least one of a starting subframe of the DL subframes, a number of second positioning subframes beginning at the starting subframe, or a periodicity of the second positioning subframes, wherein one of the plurality of positioning subframes and one of the second positioning subframes correspond to a first DL subframe of the plurality of DL subframes. The wireless communication device may receive the plurality of PRSs by receiving a first PRS of the plurality of PRSs in the first DL subframe.

In an embodiment, the wireless communication device may receive the PRSs from various frequency bands, such as the an in-band communication frequency band (e.g., the frequency band 514) associated with the plurality of DL subframes, a frequency band (e.g., the frequency bands 512 and 520) outside of the in-band communication frequency band, or a non-anchoring signal carrier (e.g., the signal carrier 620) of a carrier aggregation associated with the plurality of DL subframes.

In an embodiment, the wireless communication device may receive a first PRS of the plurality of PRSs from a first beam and a second PRS of the plurality of PRSs from a different second beam. In some embodiments, the wireless communication device may receive PRSs from one beam direction during a set of consecutive subframes (e.g., the positioning subframes 1310) and switches to another beam direction to receive PRSs from another set of consecutive subframes.

Figure 20:
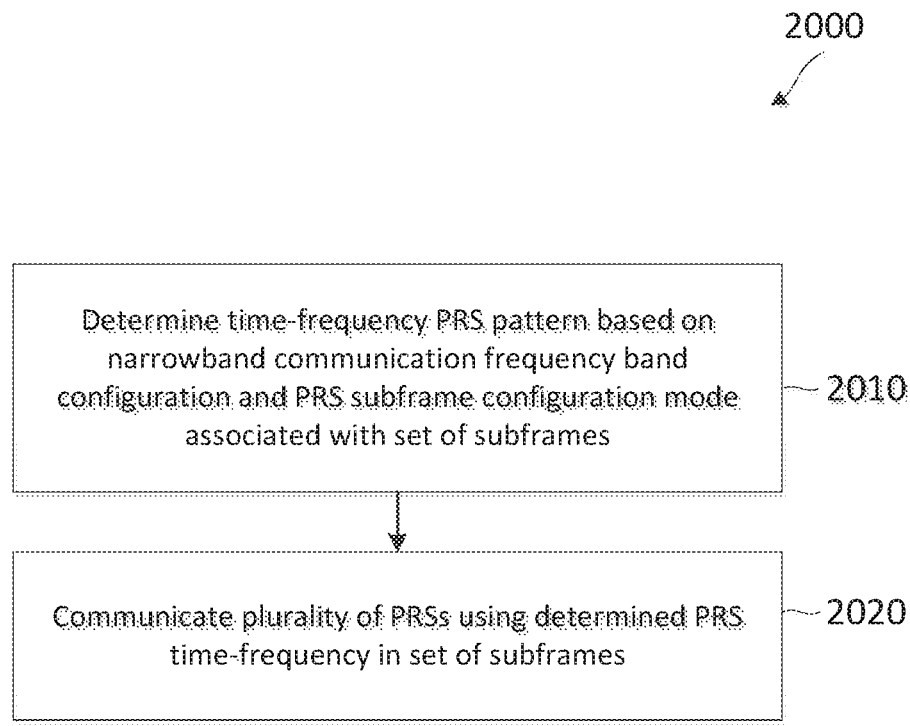
FIG. 20 is a flow diagram of a method of communicating NPRSs according to embodiments of the present disclosure.

FIG. 20 is a flow diagram of a method 2000 of communicating NPRSs according to embodiments of the present disclosure. Steps of the method 2000 can be executed by a computing device (e.g., a processor, processing circuit, and/or other suitable component) of a wireless communication device, such as the UEs 102 and 300. The method 2000 may employ similar mechanisms as in the methods 500 to 1900. The method 2000 can be better understood with reference to FIG. 1. As illustrated, the method 2000 includes a number of enumerated steps, but embodiments of the method 2000 may include additional steps before, after, and in between the enumerated steps. In some embodiments, one or more of the enumerated steps may be omitted or performed in a different order.

At step 2010, the method includes determining, by a first wireless communication device, a time-frequency PRS pattern based at least in part on a narrowband communication frequency band configuration (e.g., the frequency bands 512, 514, 520, and 620) and a PRS subframe configuration mode (e.g., type A or type B) associated with a set of subframes (e.g., the positioning subframes 1122 and 1310).

Each subframe of the set of subframes includes a plurality of frequency tones (e.g., the frequency tones 218) in a plurality of symbols (e.g., the symbols 212), and wherein the time-frequency PRS pattern includes time-frequency resources (e.g., the time-frequency resource 1350) in a subset of the plurality of frequency tones in a subset of the plurality of symbols. The time-frequency PRS pattern can include at least one time-frequency resource in each symbol of the plurality of symbols.

At step 2020, the method includes communicating, by the first wireless communication device with a second wireless communication device, a plurality of PRSs (e.g., the NPRSs 220, 531-533, 631, 730, 940, 1130, 1340, 1732, and 1734) using the determined PRS time-frequency pattern in the set of subframes. In an embodiment, the first wireless communication device may be a BS and the second wireless communication device may be a UE. In an embodiment, the first wireless communication device may be a UE and the second wireless communication device may be a BS.

In an embodiment, the first wireless communication device can further determine that the narrowband communication frequency band configuration indicates at least one of a guard band (e.g., the frequency bands 512) of a wideband communication frequency band (e.g., the frequency bands 510), an in-band frequency band (e.g., the frequency bands 514) within the wideband communication frequency band, or a standalone frequency band (e.g., the frequency bands 520) independent of the wideband communication frequency band. In an embodiment, the wideband communication frequency band is a non-anchoring carrier frequency band (e.g., the non-anchoring signal carrier 620) of a wideband communication.

In an embodiment, the first wireless communication device can determine time-frequency PRS pattern by determining a first time-frequency PRS pattern when the narrowband communication frequency band configuration includes the guard band or the standalone frequency band and determining a second time-frequency PRS pattern different than the first time-frequency PRS pattern when the narrowband communication frequency band configuration includes the in-band frequency band.

In an embodiment, the first wireless communication device can determine that a PRS configuration of the PRS subframe configuration mode indicates at least one of a first configuration (e.g., type A) or a second configuration (e.g., type B) based on the narrowband communication frequency band configuration. The first configuration including a bitmap (e.g., the bitmask 1302) indicating a set of PRS subframes (e.g., the positioning subframes 1310) positioned within a group of contiguous subframes (e.g., the subframes 910) the bitmap including a length corresponding to a number of subframes in the group of contiguous subframes. The second configuration indicating a subset of the group of contiguous subframes by including at least one of a starting subframe (e.g., the starting subframe 1410) for the subset, a number of subframes (e.g., the number 1412 of positioning subframes) in the subset, or a periodicity (e.g., the periodicity 1414) of the subset. The first wireless communication device can communicate the PRS configuration with the second wireless communication device.

In an embodiment, the first wireless communication device can determine that the time-frequency PRS pattern includes a predetermined time-frequency PRS pattern without puncturing any time-frequency resource from the predetermined time-frequency PRS pattern based on a predetermined narrowband communication reference signal when the PRS subframe configuration mode indicates the first configuration or a combination of the first configuration and the second configuration, for example, as shown in the method 1300 described with respect to FIG. 13.

In an embodiment, the first wireless communication device can determine that the time-frequency PRS pattern includes a predetermined time-frequency PRS pattern with at least one time-frequency resource punctured (e.g., the NPRS punctured time-frequency resources 1370) from the predetermined time-frequency PRS pattern based on a predetermined narrowband communication reference signal (e.g., an NRS) when the PRS subframe configuration mode indicates the second configuration without the first configuration, for example, as shown in the method 1400 described with respect to FIG. 14. In some instances, when the first wireless communication device is a UE, the first wireless communication device may skip any symbol within a subframe that is pre-configured for a predetermined narrowband communication reference signal.

In an embodiment, the first wireless communication device can communicate the plurality of PRSs in the subset of the group of contiguous subframes by excluding a PRS transmission in the subset that are preconfigured for a predetermined narrowband communication broadcast signal when the PRS subframe configuration mode indicates the second configuration without the first configuration. The predetermined narrowband communication broadcast signal includes at least one of a NPSS, a NSSS, a NPBCH signal, or a narrowband system information block part-one (NSIB1) signal.

In an embodiment, the first wireless communication device can communicate the plurality of PRSs in subframes that are within the subset of the group of contiguous subframes indicated by the second configuration and within the set of PRS subframes indicated by the first configuration when the PRS subframe configuration mode indicates the combination of the first configuration and the second configuration.

In an embodiment, the first wireless communication device can communicate the plurality of PRSs in the in-band frequency band by excluding a PRS transmission in one or more symbols within the set of subframes that are associated with a wideband communication in the wideband communication frequency band. The one or more symbols within the set of subframes includes at least one of a transmission of a cell-specific reference signal (CRS) of the wideband communication or a transmission of a physical downlink control channel (PDCCH) signal of the wideband communication. In an embodiment, the wideband communication may be a LTE communication. The one or more symbols can include symbols indexed 0, 4, 7, and 11 of a subframe when the LTE communication uses one or two CRS ports (e.g., antenna ports). The one or more symbols can include symbols indexed 1 and 8 of a subframe when the LTE communication uses four CRS ports. The one or more symbols can include symbols indexed 0, 1, and 2 of a subframe reserved for PDCCH transmissions.

In an embodiment, the first wireless communication device can communicate information associated with the wideband communication (e.g., a LTE communication) including at least one of a subframe configuration indicating the one or more symbols or a PRS configuration of the wideband communication. The information may be referred to as assistance information. The assistance information can include a subframe offset with respect to a serving cell of the first and second wireless communication devices, a radio frame offset with respect to the serving cell, a number of CRS ports, a number of NRS ports, a valid subframe bitmap configuration. For in-band deployment, the assistance information can include other configured PRS such as LTE PRSs sent on a wider bandwidth, a bandwidth of LTE cell, a number of LTE control symbols, and symbol locations for CSI-RSs for one or more of serving and neighboring cells.

In an embodiment, the first wireless communication device can communicate the plurality of PRSs by communicating a first subset of the plurality of PRSs (e.g., the NPRSs 1732) using a first beam during a first time period corresponding to the bitmap or the periodicity and communicating a second subset of the plurality of PRSs (e.g., the NPRSs 1734) using a second beam during a repeating time period corresponding to the bitmap or the periodicity, the first beam and the second beam include different beam directions.

In an embodiment, the first wireless communication device can communicate the plurality of PRSs by communicating a first PRS (e.g., the NPRSs 1732) of the plurality of PRSs using a first beam and communicating a second PRS (e.g., the NPRSs 1734) of the plurality of PRSs using a second beam, the first beam and the second beam include different beam directions.

In some embodiments, a network (e.g., the network 100) may employ a new positioning reference signal for OTDOA in NB-IoT that is not based on existing LTE Release 13 NB-IoT signal and not based on LTE CRS. The subframes (e.g., the positioning subframes 1310) which contain NPRS (e.g., the NPRSs 1340) are configured by higher-layers. Per NB-IoT carrier, it may configure the subframes used for NPRS transmission such that NPRS do not occur in subframes containing transmissions to LTE Release 13 UEs in the cell of NPDCCH, NPDSCH, NPBCH, and NPSS/NSSS.

In an embodiment of configuration of time resources for NPRS, indication of exact subframes is by part A or type A (e.g., the method 1300): A bitmap (e.g., the bitmask 1302) on subframes which are not NB-IoT DL subframes (i.e. invalid DL subframes). In an embodiment of type A, the bitmap is a fixed length of 10 bits. In an embodiment of type A, the bitmap is the same length as valid subframe configuration, i.e. 10 bits or 40 bits. In an embodiment of type A, the bitmap is a fixed length of x bits (e.g., x=20).

In an embodiment of part B or type B (e.g., the method 1400), indicated with one start subframe (e.g., the starting subframe 1410), one periodicity (e.g., the periodicity 1414), and one number of repetitions (e.g., the number 1412 of subframes) for the occasions. On an anchor carrier (e.g., the carrier 610), type A and/or type B may be used. On a non-anchor carrier (e.g., the carrier 620), type A and/or type B may be used. Indication of NPRS muting patterns is indicated with a periodic NPRS muting sequence.

In an embodiment of an in-band scenario (e.g., the frequency band 514), the NPRS subframe configuration is type A or (type A and type B). The legacy LTE PRS pattern in on PRB is adopted. In an embodiment of a standalone (e.g., the frequency band 520) or guard-band scenario (e.g., the frequency bands 512), the NPRS subframe configuration is type A or (type A and type B). If NPRS subframe configuration is type B, NPRS is punctured in OFDM symbols 5 and 6 in each slot (e.g., as shown in the method 1400).

In an embodiment, the slotNumberOffset and SFN_offset between a reference cell and a neighbor cell for OTDOA in NB-IoT can optionally be included in assistance data for OTDOA. The slotNumberOffset corresponds to the number of full slots counted from the beginning of a radio frame of the assistance data reference cell to the beginning of the closest subsequent radio frame of the neighbor cell. The SFN_offset corresponds to the number of full radio frames counted from the beginning of a radio frame #0 of the assistance data reference cell to the beginning of the closest subsequent radio frame #0 of the neighbor cell.

In an embodiment, per Per NB-IoT carrier configured for NPRS, a UE may assume the same precoder is used for a number of NPRS subframes corresponding to the length of a bitmap for type A or (type A and type B) and a "number of subframe" parameter for type B only.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising configuring, by a wireless communication device, a plurality of positioning subframes of a plurality of downlink (DL) subframes, wherein the plurality of DL subframes include one or more pre-configured subframes for carrying one or more pre-determined signals, and wherein at least one of the plurality of positioning subframes are non-overlapping with the one or more pre-configured subframes; and transmitting, by the wireless communication device, a plurality of narrowband positioning reference signals (NPRSs) in the plurality of positioning subframes.

The method further includes wherein the plurality of NPRSs is associated with Q repetitions of a frequency pattern, wherein Q is a positive integer, and wherein the configuring the plurality of positioning subframes includes identifying N consecutive subframes in the plurality of DL subframes that are non-overlapping with the one or more pre-configured subframes, wherein N is a positive integer; and configuring the plurality of positioning subframes in Q consecutive subframes of the N consecutive subframes when Q is less than or equal to N. The method further includes wherein the configuring the plurality of positioning subframes further includes configuring the plurality of positioning subframes in the N consecutive subframes when Q is greater than N, and wherein the transmitting the plurality of NPRSs when Q is greater than N includes transmitting the plurality of NPRSs associated with N of the Q repetitions in the N consecutive subframes; and dropping (Q-N) of the Q repetitions for transmission. The method further includes wherein the configuring the plurality of positioning subframes further includes configuring the plurality of positioning subframes in the N consecutive subframes and at least one following subframe that is non-overlapping with the one or more pre-configured subframes when Q is greater than N, and wherein the N consecutive subframes and the at least one following subframe are separated by at least one of the one or more pre-configured subframes. The method further includes wherein the pre-determined signals include at least one of a narrowband broadcast channel (NBCH) signal, a system information block-narrowband (SIB-NB) signal, a narrowband primary synchronization (NPSS), a narrowband secondary synchronization signal (NSSS), a narrowband reference signal (NRS), a Long-Term Evolution (LTE) cell-specific reference signal (CRS), a LTE channel state information-reference signal (CSI-RS), or a LTE positioning reference signal (PRS). The method further includes wherein a first positioning subframe of the plurality of positioning subframes overlaps with a first pre-configured subframe of the one or more pre-configured subframes, wherein the first pre-configured subframe includes a first frequency tone pre-configured for one of the one or more pre-determined signals, and wherein the transmitting the plurality of NPRSs includes transmitting a first NPRS of the plurality of NPRSs in the first positioning subframe on a second frequency tone different than the first frequency tone. The method further includes wherein a first positioning subframe of the plurality of positioning subframes overlaps with a first pre-configured subframe of the one or more pre-configured subframes, wherein the first pre-configured subframe includes a first frequency tone pre-configured for a first pre-determined signal of the one or more pre-determined signals, and wherein the transmitting the plurality of NPRSs includes transmitting a first NPRS of the plurality of NPRSs in the first positioning subframe by transmitting the first NPRS in the first frequency tone; and excluding transmission of the first pre-determined signal in the first frequency tone. The method further includes transmitting, by the wireless communication device to a user equipment (UE), a DL schedule indicating that the plurality of positioning subframes are invalid DL subframes for carrying DL data. The method further includes transmitting, by the wireless communication device to a user equipment (UE), a DL schedule indicating that at least one of the plurality of positioning subframes is a valid DL subframe for carrying DL data. The method further includes wherein the plurality of DL subframes are associated with an anchoring signal carrier of a carrier aggregation, and wherein the plurality of positioning subframes are associated with a non-anchoring signal carrier of the carrier aggregation. The method further includes wherein the plurality of positioning subframes include a first subset of consecutive subframes and a second subset of consecutive subframes of the plurality of DL subframes, and wherein the transmitting the plurality of NPRSs includes transmitting first NPRSs of the plurality of NPRSs associated with a first frequency pattern in the first subset of consecutive subframes; and transmitting second NPRSs of the plurality of NPRSs associated with a second frequency pattern in the second subset of consecutive subframes, wherein the first frequency pattern and the second frequency pattern are different. The method further includes wherein the plurality of positioning subframes includes a first subset of consecutive subframes and a second subset of consecutive subframes of the plurality of DL subframes, and wherein the transmitting the plurality of NPRSs includes transmitting first NPRSs of the plurality of NPRSs on a first beam in the first subset of consecutive subframes; and transmitting second NPRSs of the plurality of NPRSs on a second beam in the second subset of consecutive subframes, wherein the first beam and the second beam are different. The method further includes wherein the transmitting the plurality of NPRSs includes applying orthogonal codes to the plurality of NPRSs. The method further includes wherein the plurality of NPRSs are transmitted in frequency tones that are shared among different cells for NPRS transmission.

Embodiments of the present disclosure further include a method of wireless communication, comprising receiving, by a wireless communication device, a plurality of narrowband positioning reference signal (NPRSs) in a plurality of positioning subframes of a plurality of downlink (DL) subframes, wherein the plurality of DL subframes include one or more pre-configured subframes for carrying one or more pre-determined signals, and wherein at least one of the plurality of positioning subframes are non-overlapping with the one or more pre-configured subframes; and computing, by the wireless communication device, a timing measurement based on the plurality of NPRSs.

The method further includes receiving, by the wireless communication device, NPRS configuration information associated with at least one of a subframe configuration of the plurality of positioning subframes, a beam direction configuration of the plurality of NPRSs, or a DL schedule in at least one of the plurality of positioning subframes. The method further includes decoding, by the wireless communication device, DL data in a first positioning subframe by excluding at least one of a plurality of frequency tones in the first positioning subframe that carries one of the plurality of NPRSs. The method further includes wherein the plurality of NPRSs are received from a non-anchoring signal carrier that is different from an anchoring signal carrier associated with the one or more pre-configured subframes. The method further includes wherein the plurality of NPRSs is encoded with an orthogonal code, and wherein the timing measurement is computed based on the orthogonal code.

Embodiments of the present disclosure include an apparatus comprising means for determining a time-frequency positioning reference signal (PRS) pattern based at least in part on a narrowband communication frequency band configuration and a PRS subframe configuration mode associated with a set of subframes; and means for communicating, with a second wireless communication device, a plurality of PRSs using the determined PRS time-frequency pattern in the set of subframes.

The apparatus further includes wherein each subframe of the set of subframes includes a plurality of frequency tones in a plurality of symbols, and wherein the time-frequency PRS pattern includes time-frequency resources in a subset of the plurality of frequency tones in a subset of the plurality of symbols. The apparatus further includes wherein the means for determining the time-frequency PRS pattern is further configured to determine the time-frequency PRS pattern based on a predetermined time-frequency PRS pattern including at least one time-frequency resource in each symbol of the plurality of symbols. The apparatus further includes means for determining that the narrowband communication frequency band configuration indicates at least one of a guard band of a wideband communication frequency band, an in-band frequency band within the wideband communication frequency band, or a standalone frequency band independent of the wideband communication frequency band. The apparatus further includes wherein the wideband communication frequency band is a non-anchoring carrier frequency band of a wideband communication. The apparatus further includes wherein the means for determining the time-frequency PRS pattern is further configured to determine a first time-frequency PRS pattern when the narrowband communication frequency band configuration includes the guard band or the standalone frequency band; and determine a second time-frequency PRS pattern different than the first time-frequency PRS pattern when the narrowband communication frequency band configuration includes the in-band frequency band. The apparatus further includes means for determining that a PRS configuration of the PRS subframe configuration mode indicates at least one of a first configuration or a second configuration based on the narrowband communication frequency band configuration, the first configuration including a bitmap indicating a set of PRS subframes positioned within a group of contiguous subframes, the bitmap including a length corresponding to a number of subframes in the group of contiguous subframes, and the second configuration indicating a subset of the group of contiguous subframes by including at least one of a starting subframe for the subset, a number of subframes in the subset, or a periodicity of the subset. The apparatus further includes means for communicating, with the second wireless communication device, the PRS configuration. The apparatus further includes means for determining the time-frequency PRS pattern is further configured to determine that the time-frequency PRS pattern includes a predetermined time-frequency PRS pattern without puncturing any time-frequency resource from the predetermined time-frequency PRS pattern based on a predetermined narrowband communication reference signal when the PRS subframe configuration mode indicates the first configuration or a combination of the first configuration and the second configuration. The apparatus further includes wherein the means for determining the time-frequency PRS pattern is further configured to determine that the time-frequency PRS pattern includes a predetermined time-frequency PRS pattern with at least one time-frequency resource punctured from the predetermined time-frequency PRS pattern based on a predetermined narrowband communication reference signal when the PRS subframe configuration mode indicates the second configuration without the first configuration. The apparatus further includes wherein the means for communicating the plurality of PRSs is further configured to communicate the plurality PRSs by communicating the plurality of PRSs in the subset of the group of contiguous subframes by excluding a PRS transmission in the subset that are preconfigured for a predetermined narrowband communication broadcast signal when the PRS subframe configuration mode indicates the second configuration without the first configuration. The apparatus further includes wherein the predetermined narrowband communication broadcast signal includes at least one of a narrowband primary synchronization signal (NPSS), a narrowband second synchronization signal (NSSS), a narrowband physical broadcast channel (NPBCH) signal, or a narrowband system information block part-one (NSIB1) signal. The apparatus further includes wherein the means for communicating the plurality of PRSs is further configured to communicate the plurality of PRSs in subframes that are within the subset of the group of contiguous subframes indicated by the second configuration and within the set of PRS subframes indicated by the first configuration when the PRS subframe configuration mode indicates the combination of the first configuration and the second configuration. The apparatus further includes wherein the means for communicating the plurality of PRSs is further configured to communicate the plurality of PRSs in the in-band frequency band by excluding a PRS transmission in one or more symbols within the set of subframes that are associated with a wideband communication in the wideband communication frequency band. The apparatus further includes wherein the one or more symbols within the set of subframes includes at least one of a transmission of a cell-specific reference signal (CRS) of the wideband communication or a transmission of a physical downlink control channel (PDCCH) signal of the wideband communication. The apparatus further includes means for communicating, with second wireless communication device, information associated with the wideband communication including at least one of a subframe configuration indicating the one or more symbols or a PRS configuration of the wideband communication. The apparatus further includes wherein the means for communicating the plurality of PRSs is further configured to communicate a first subset of the plurality of PRSs using a first beam during a first time period corresponding to the bitmap or the periodicity; and communicate a second subset of the plurality of PRSs using a second beam during a repeating time period corresponding to the bitmap or the periodicity, the first beam and the second beam include different beam directions. The apparatus further includes wherein the means for communicating the plurality of PRSs is further configured to communicate a first PRS of the plurality of PRSs using a first beam; and communicate a second PRS of the plurality of PRSs using a second beam, the first beam and the second beam include different beam directions.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    communicating, by a first wireless communication device with a second wireless communication device, a positioning reference signal (PRS) configuration for a set of subframes;
    determining, by the first wireless communication device, whether the PRS configuration includes a first indication format, a second indication format, or a combination of the first indication format and the second indication format;
    determining, by the first wireless communication device, a PRS time-frequency pattern for a first subframe in response to determining that the PRS configuration includes the combination of the first indication format and the second indication format; and
    communicating, by the first wireless communication device with the second wireless communication device in a narrowband communication frequency band, a first PRS including the determined PRS time-frequency pattern in the first subframe,
    wherein the first indication format includes a bitmap indicating a set of PRS subframes positioned within a group of contiguous subframes, the bitmap including a length corresponding to a number of subframes in the group of contiguous subframes, and the set of PRS subframes including the first subframe, and
    wherein the second indication format indicates a subset of the group of contiguous subframes by including at least one of a starting subframe for the subset, a number of subframes in the subset, or a periodicity of the subset, the subset including the first subframe.

2. The method of claim 1, wherein the first subframe includes a plurality of frequency tones in a plurality of symbols, and wherein the PRS time-frequency pattern includes time-frequency resources in a subset of the plurality of frequency tones in a subset of the plurality of symbols.

3. The method of claim 2, wherein the determining the PRS time-frequency pattern is further based on a predetermined PRS time-frequency pattern including at least one time-frequency resource in each symbol of the plurality of symbols.

4. The method of claim 2, wherein the narrowband communication frequency band is within at least one of a guard band of a wideband communication frequency band, an in-band frequency band within the wideband communication frequency band, or a standalone frequency band independent of the wideband communication frequency band.

5. The method of claim 4, wherein the wideband communication frequency band is a non-anchoring carrier frequency band of a wideband communication.

6. The method of claim 1, wherein the determining the PRS time-frequency pattern includes:
    determining that the PRS time-frequency pattern includes a predetermined PRS time-frequency pattern without puncturing any time-frequency resource from the predetermined PRS time-frequency pattern based on a predetermined narrowband communication reference signal when determining that the PRS configuration includes the combination of the first indication format and the second indication format.

7. The method of claim 1, further comprising:
    communicating, by the first wireless communication device with the second wireless communication device in the narrowband communication frequency band, a plurality of PRSs in subframes that are within the subset of the group of contiguous subframes indicated by the second indication format and within the set of PRS subframes indicated by the first indication format when determining that the PRS configuration includes the combination of the first indication format and the second indication format, the plurality of PRSs including the first PRS.

8. The method of claim 1, further comprising:
communicating, by the first wireless communication device with the second wireless communication device in the narrowband communication frequency band within a wideband communication frequency band, a plurality of PRSs by excluding a PRS transmission in one or more symbols within a subframe of at least one of the set of PRS subframes or the subset of the group of contiguous subframes, the one or more symbols associated with a wideband communication in the wideband communication frequency band, and the plurality of PRSs including the first PRS.

9. The method of claim 8, wherein the wideband communication is a Long-Term Evolution (LTE) communication, and wherein the one or more symbols include at least one of a transmission of a cell-specific reference signal (CRS) of the wideband communication or a transmission of a physical downlink control channel (PDCCH) signal of the wideband communication.

10. The method of claim 9, further comprising communicating, by the first wireless communication device with the second wireless communication device, assistance information including at least one of a LTE PRS configuration, a bandwidth of a LTE cell, a number of LTE control symbols, a maximum number of LTE control symbols, or a CSI-RS configuration for one or more serving and neighboring cells.

11. The method of claim 1, further comprising:
communicating, by the first wireless communication device with the second wireless communication device in the narrowband communication frequency band, a first subset of a plurality of PRSs using a first beam during a first time period corresponding to the bitmap or the periodicity, the first subset of the plurality of PRSs including the first PRS; and
communicating, by the first wireless communication device with the second wireless communication device in the narrowband communication frequency band, a second subset of the plurality of PRSs using a second beam during a repeating time period corresponding to the bitmap or the periodicity, the first beam and the second beam include different beam directions.

12. The method of claim 1, wherein the communicating includes:
communicating the first PRS using a first beam, and wherein the method further comprises:
communicating, by the first wireless communication device with the second wireless communication device in the narrowband communication frequency band, a second PRS in a second subframe using a second beam, the first beam and the second beam include different beam directions.

13. The method of claim 1, further comprising communicating, by the first wireless communication device with the second wireless communication device, assistance information including at least one of a subframe offset with respect to a serving cell, a radio frame offset with respect to the serving cell, a number of cell-specific reference signal (CRS) ports, a number of narrowband reference signal (NRS) ports, or a valid subframe bitmap configuration.

14. An apparatus comprising:
a transceiver configured to communicate, with a second wireless communication device, a positioning reference signal (PRS) configuration; and
a processor configured to:
determine whether the PRS configuration includes a first indication format, a second indication format, or a combination of the first indication format and the second indication format; and
determine a PRS time-frequency pattern for a first subframe in response to determining that the PRS configuration includes the combination of the first indication format and the second indication format,
wherein the transceiver is further configured to communicate, with the second wireless communication device in a narrowband communication frequency band, a first PRS including the determined PRS time-frequency pattern in the first subframe,
wherein the first indication format includes a bitmap indicating a set of PRS subframes positioned within a group of contiguous subframes, the bitmap including a length corresponding to a number of subframes in the group of contiguous subframes, and the set of PRS subframes including the first subframe, and
wherein the second indication format indicates a subset of the group of contiguous subframes by including at least one of a starting subframe for the subset, a number of subframes in the subset, or a periodicity of the subset, the subset including the first subframe.

15. The apparatus of claim 14, wherein the first subframe includes a plurality of frequency tones in a plurality of symbols, and wherein the PRS time-frequency pattern includes time-frequency resources in a subset of the plurality of frequency tones in a subset of the plurality of symbols.

16. The apparatus of claim 15, wherein the processor is further configured to determine the PRS time-frequency pattern further based on a predetermined PRS time-frequency pattern including at least one time-frequency resource in each symbol of the plurality of symbols.

17. The apparatus of claim 15, wherein the narrowband communication frequency band is within at least one of a guard band of a wideband communication frequency band, an in-band frequency band within the wideband communication frequency band, or a standalone frequency band independent of the wideband communication frequency band.

18. The apparatus of claim 17, wherein the wideband communication frequency band is a non-anchoring carrier frequency band of a wideband communication.

19. The apparatus of claim 14, wherein the processor is further configured to determine the PRS time-frequency pattern by determining that the PRS time-frequency pattern includes a predetermined PRS time-frequency pattern without puncturing any time-frequency resource from the predetermined PRS time-frequency pattern based on a predetermined narrowband communication reference signal when determining that the PRS configuration includes the combination of the first indication format and the second indication format.

20. The apparatus of claim 14, wherein the transceiver is further configured to communicate, with the second wireless communication device in the narrowband communication frequency band, a plurality of PRSs in subframes that are within the subset of the group of contiguous subframes indicated by the second indication format and within the set of PRS subframes indicated by the first indication format when determining that the PRS configuration includes the combination of the first indication format and the second indication format, the plurality of PRSs including the first PRS.

21. The apparatus of claim 14, wherein the transceiver is further configured to communicate, with the second wireless communication device in the narrowband communication frequency band within the in band a wideband communication frequency band, a plurality of PRSs by excluding a PRS transmission in one or more symbols within a subframe of at least one of the set of PRS subframes or the subset of the group of contiguous subframes, the one or more symbols associated with a wideband communication in the wideband communication frequency band, and the plurality of PRSs including the first PRS.

22. The apparatus of claim 21, wherein the wideband communication is a Long-Term Evolution (LTE) communication, and wherein the one or more symbols include at least one of a transmission of a cell-specific reference signal (CRS) of the wideband communication or a transmission of a physical downlink control channel (PDCCH) signal of the wideband communication.

23. The apparatus of claim 22, wherein the transceiver is further configured to communicate, with the second wireless communication device, assistance information including at least one of a LTE PRS configuration, a bandwidth of a LTE cell, a number of LTE control symbols, a maximum number of LTE control symbols, or a CSI-RS configuration for one or more serving and neighboring cells.

24. The apparatus of claim 14, wherein the transceiver is further configured to:
  communicate, with the second wireless communication device in the narrowband communication frequency band, a first subset of a plurality of PRSs using a first beam during a first time period corresponding to the bitmap or the periodicity, the first subset of the plurality of PRSs including the first PRS; and
  communicate, with the second wireless communication device in the narrowband communication frequency band, a second subset of the plurality of PRSs using a second beam during a repeating time period corresponding to the bitmap or the periodicity, the first beam and the second beam include different beam directions.

25. The apparatus of claim 14, wherein the transceiver is further configured to:
  communicate, with the second wireless communication device in the narrowband communication frequency band, the first PRS using a first beam; and
  communicate, with the second wireless communication device in the narrowband communication frequency band, a second PRS using a second beam, the first beam and the second beam include different beam directions.

26. The apparatus of claim 14, wherein the transceiver is further configured to communicate, with the second wireless communication device, assistance information including at least one of a subframe offset with respect to a serving cell, a radio frame offset with respect to the serving cell, a number of cell-specific reference signal (CRS) ports, a number of narrowband reference signal (NRS) ports, or a valid subframe bitmap configuration.

27. A non-transitory computer-readable medium having program code recorded thereon, the program code comprising:
  code for causing a first wireless communication device to communicate, with a second wireless communication device, a positioning reference signal (PRS) configuration; determining,
  code for causing the first wireless communication device to determine whether the PRS configuration includes a first indication format, a second indication format, or a combination of the first indication format and the second indication format;
  code for causing the first wireless communication device to determine a PRS time-frequency pattern for a first subframe in response to determining that the PRS configuration includes the combination of the first indication format and the second indication format; and
  code for causing the first wireless communication device to communicate, with the second wireless communication device in a narrowband communication frequency band, a first PRS including the determined PRS time-frequency pattern in the first subframe,
  wherein the first indication format includes a bitmap indicating a set of PRS subframes positioned within a group of contiguous subframes, the bitmap including a length corresponding to a number of subframes in the group of contiguous subframes, and the set of PRS subframes including the first subframe, and
  wherein the second indication format indicates a subset of the group of contiguous subframes by including at least one of a starting subframe for the subset, a number of subframes in the subset, or a periodicity of the subset, the subset including the first subframe.

28. The non-transitory computer-readable medium of claim 27, wherein the first subframe includes a plurality of frequency tones in a plurality of symbols, and wherein the PRS time-frequency pattern includes time-frequency resources in a subset of the plurality of frequency tones in a subset of the plurality of symbols.

29. The non-transitory computer-readable medium of claim 28, wherein the code for causing the first wireless communication device to determine the PRS time-frequency pattern is further configured to determine the PRS time-frequency pattern based on a predetermined PRS time-frequency pattern including at least one time-frequency resource in each symbol of the plurality of symbols.

30. The non-transitory computer-readable medium of claim 28, wherein the narrowband communication frequency band is within at least one of a guard band of a wideband communication frequency band, an in-band frequency band within the wideband communication frequency band, or a standalone frequency band independent of the wideband communication frequency band.

31. The non-transitory computer-readable medium of claim 30, wherein the wideband communication frequency band is a non-anchoring carrier frequency band of a wideband communication.

32. The non-transitory computer-readable medium of claim 27, wherein the code for causing the first wireless communication device to determine the PRS time-frequency pattern is further configured to:
  determine that the PRS time-frequency pattern includes a predetermined PRS time-frequency pattern without puncturing any time-frequency resource from the predetermined time-frequency PRS pattern based on a predetermined narrowband communication reference signal when determining that the PRS configuration includes the combination of the first indication format and the second indication format.

33. The non-transitory computer-readable medium of claim 27, further comprising:
  code for causing the first wireless communication device to communicate, with the second wireless communication device in the narrowband communication frequency band, a plurality of PRSs in subframes that are within the subset of the group of contiguous subframes indicated by the second indication format and within the set of PRS subframes indicated by the first indication format when determining that the PRS configuration includes the combination of the first indication format and the second indication format, the plurality of PRSs including the first PRS.

34. The non-transitory computer-readable medium of claim 27, further comprising:
  code for causing the first wireless communication device to communicate, with the second wireless communication device in the narrowband communication frequency band within a wideband communication frequency band, a plurality of PRSs by excluding a PRS transmission in one or more symbols within a subframe of at least one of the set of PRS subframes or the subset of the group of contiguous subframes, the one or more symbols associated with a wideband communication in the wideband communication frequency band, and the plurality of PRSs including the first PRS.

35. The non-transitory computer-readable medium of claim 34, wherein the wideband communication is a Long-Term Evolution (LTE) communication, and wherein the one or more symbols include at least one of a transmission of a cell-specific reference signal (CRS) of the wideband communication or a transmission of a physical downlink control channel (PDCCH) signal of the wideband communication.

36. The non-transitory computer-readable medium of claim 35, further comprising code for causing the first wireless communication device to communicate, with the second wireless communication device, assistance information including at least one of a LTE PRS configuration, a bandwidth of a LTE cell, a number of LTE control symbols, a maximum number of LTE control symbols, or a CSI-RS configuration for one or more serving and neighboring cells.

37. The non-transitory computer-readable medium of claim 27, further comprising:
  code for causing the first wireless communication device to communicate, with the second wireless communication device in the narrowband communication frequency band, a first subset of a plurality of PRSs using a first beam during a first time period corresponding to the bitmap or the periodicity, the first subset of the plurality of PRSs including the first PRS; and
  code for causing the first wireless communication device to communicate, with the second wireless communication device in the narrowband communication frequency band, a second subset of the plurality of PRSs using a second beam during a repeating time period corresponding to the bitmap or the periodicity, the first beam and the second beam include different beam directions.

38. The non-transitory computer-readable medium of claim 27, wherein the code for causing the first wireless communication device to communicate the first PRS is further configured to communicate the first PRS using a first beam, and wherein the non-transitory computer-readable medium further comprises:
  code for causing the first wireless communication device to communicate, with the second wireless communication device in the narrowband communication frequency band, a second PRS in a second subframe using a second beam, the first beam and the second beam include different beam directions.

39. The non-transitory computer-readable medium of claim 27, further comprising code for causing the first wireless communication device to communicate, with the second wireless communication device, assistance information including at least one of a subframe offset with respect to a serving cell, a radio frame offset with respect to the serving cell, a number of cell-specific reference signal (CRS) ports, a number of narrowband reference signal (NRS) ports, or a valid subframe bitmap configuration.

* * * * *